US008837605B2

(12) United States Patent
Heng et al.

(10) Patent No.: US 8,837,605 B2
(45) Date of Patent: Sep. 16, 2014

(54) METHOD AND APPARATUS FOR COMPRESSED VIDEO BITSTREAM CONVERSION WITH REDUCED-ALGORITHMIC-DELAY

(75) Inventors: Wei Jyh Heng, Rohnert Park, CA (US); Wei Zhou, Novato, CA (US); Jianwei Wang, Larkspur, CA (US); Marwan A. Jabri, Tiburon, CA (US); Chengji Zhao, Penshurst (AU)

(73) Assignee: Onmobile Global Limited, Bangalore (IN)

( * ) Notice: Subject to any disclaimer, the term of this patent is extended or adjusted under 35 U.S.C. 154(b) by 1042 days.

(21) Appl. No.: 11/862,117

(22) Filed: Sep. 26, 2007

(65) Prior Publication Data

US 2008/0080619 A1    Apr. 3, 2008

Related U.S. Application Data

(60) Provisional application No. 60/847,464, filed on Sep. 26, 2006.

(51) Int. Cl.
*H04N 7/12* (2006.01)
*H04N 19/40* (2014.01)
*H04N 19/86* (2014.01)
*H04N 19/61* (2014.01)

(52) U.S. Cl.
CPC ....... *H04N 7/26941* (2013.01); *H04N 7/26888* (2013.01); *H04N 7/50* (2013.01)
USPC ................ 375/240.29; 375/240.18; 370/466

(58) Field of Classification Search
None
See application file for complete search history.

(56) References Cited

U.S. PATENT DOCUMENTS

| | | | | |
|---|---|---|---|---|
| 6,275,536 B1* | 8/2001 | Chen et al. | ............... | 375/240.25 |
| 6,748,020 B1* | 6/2004 | Eifrig et al. | ............. | 375/240.26 |
| 6,847,656 B1* | 1/2005 | Wu et al. | ........................ | 370/477 |
| 6,950,464 B1* | 9/2005 | Shen et al. | ............... | 375/240.03 |
| 6,961,956 B2* | 11/2005 | Bontempi | ..................... | 725/151 |
| 6,990,202 B2* | 1/2006 | Wee et al. | ..................... | 380/200 |
| 7,016,337 B1* | 3/2006 | Wu et al. | ........................ | 370/352 |
| 7,054,335 B2* | 5/2006 | Wee et al. | ..................... | 370/486 |
| 7,136,485 B2* | 11/2006 | Wee et al. | ........................ | 380/37 |
| 7,328,027 B1* | 2/2008 | Mangal | ........................ | 455/453 |
| 7,529,276 B1* | 5/2009 | Ramakrishnan | .............. | 370/516 |

(Continued)

OTHER PUBLICATIONS

International Search Report and Written Opinion of PCT Application No. PCT/US0779573, mailed Mar. 27, 2008, 9 pages total.

*Primary Examiner* — Ayaz Sheikh
*Assistant Examiner* — Faiyazkhan Ghafoerkhan
(74) *Attorney, Agent, or Firm* — Hoffmann & Baron, LLP

(57) ABSTRACT

The present invention relates to converting media bitstreams across different networks in a media gateway without any algorithmic delay, and reduces the computation load within the transmission in the situation where the bandwidth of the outgoing network varies dynamically. A first embodiment of the present invention provides an apparatus and a method for a Reduced-Algorithmic-Delay Media Stream Unit Conversion module which is a light weight Simple Pass-Through operation. A second embodiment of the present invention provides an apparatus and a method for a Reduced-Algorithmic-Delay Video Rate Conversion. An alternative embodiment provides an apparatus and a method for a Smart Pass-Through Operation which involves switching between the Simple Pass-Through and the Rate Converter. The methods and apparatuses provided by the first and second embodiment can be used as a stand alone system, or as part of the module of the alternative embodiment.

27 Claims, 21 Drawing Sheets

(56) References Cited

U.S. PATENT DOCUMENTS

| | | | | |
|---|---|---|---|---|
| 7,830,969 B2* | 11/2010 | Wee et al. | | 375/240.29 |
| 8,213,953 B1* | 7/2012 | Mangal | | 455/453 |
| 2002/0061012 A1* | 5/2002 | Thi et al. | | 370/352 |
| 2002/0072364 A1* | 6/2002 | Tamura | | 455/432 |
| 2002/0163911 A1* | 11/2002 | Wee et al. | | 370/389 |
| 2003/0041256 A1* | 2/2003 | Wee et al. | | 713/193 |
| 2003/0068040 A1* | 4/2003 | Wee et al. | | 380/200 |
| 2003/0068041 A1* | 4/2003 | Wee et al. | | 380/200 |
| 2003/0070081 A1* | 4/2003 | Wee et al. | | 713/189 |
| 2003/0161294 A1* | 8/2003 | Yepez et al. | | 370/352 |
| 2004/0179597 A1* | 9/2004 | Rault | | 375/240.08 |
| 2005/0005024 A1* | 1/2005 | Samuels et al. | | 709/238 |
| 2005/0021621 A1* | 1/2005 | Welch et al. | | 709/204 |
| 2005/0041689 A1* | 2/2005 | Wu et al. | | 370/477 |
| 2005/0058131 A1* | 3/2005 | Samuels et al. | | 370/389 |
| 2005/0060426 A1* | 3/2005 | Samuels et al. | | 709/238 |
| 2005/0152449 A1* | 7/2005 | Nemiroff et al. | | 375/240.03 |
| 2005/0232232 A1* | 10/2005 | Farber et al. | | 370/352 |
| 2005/0258983 A1* | 11/2005 | Jabri et al. | | 341/50 |
| 2007/0036354 A1* | 2/2007 | Wee et al. | | 380/37 |
| 2007/0064901 A1* | 3/2007 | Baird et al. | | 379/202.01 |
| 2007/0133441 A1* | 6/2007 | Kang et al. | | 370/282 |

* cited by examiner

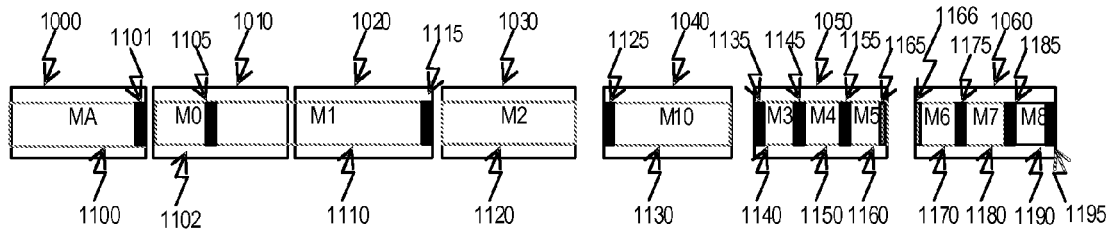
FIG 1A. Incoming Packets
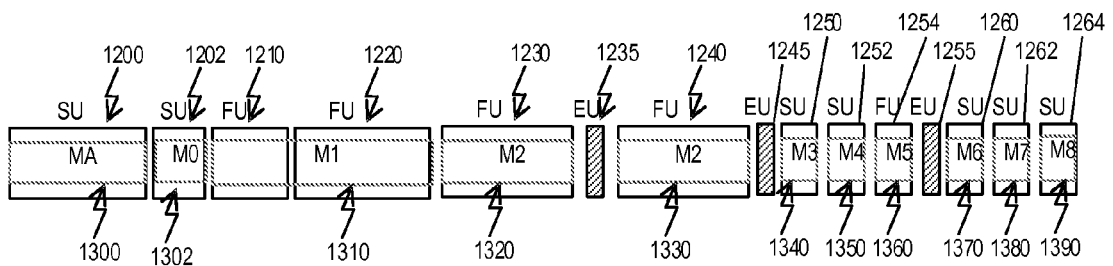
FIG 1B. Outgoing Packets without Aggregation Units
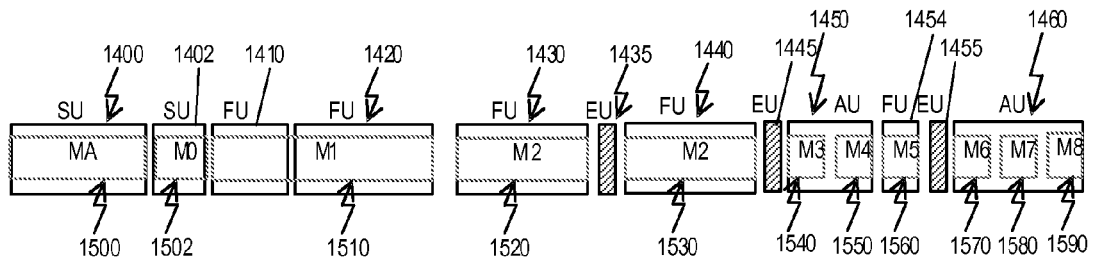
FIG 1C. Outgoing Packets with Aggregation Units
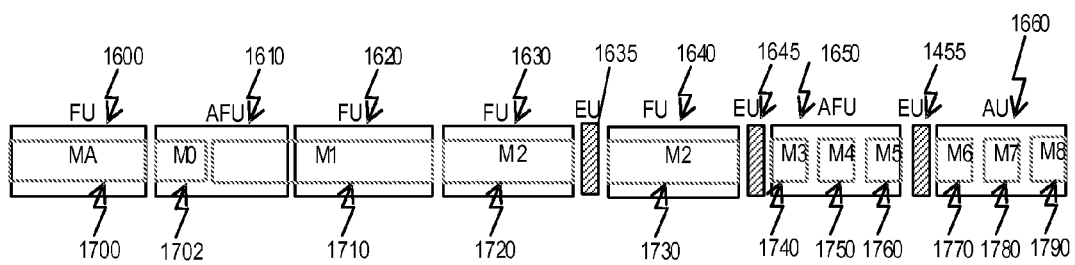
FIG 1D. Outgoing Packets with Aggregation Fragmentation Units

METHOD AND APPARATUS FOR COMPRESSED VIDEO BITSTREAM CONVERSION WITH REDUCED-ALGORITHMIC-DELAY

CROSS-REFERENCES TO RELATED APPLICATIONS

The present application claims benefit under 35 U.S.C. §119(e) of U.S. Provisional Patent Application No. 60/847,464, filed Sep. 26, 2006, entitled "Method and Apparatus for Compressed Video Bitstream Conversion with Reduced-Algorithmic-Delay," the disclosure of which is incorporated herein by reference in its entirety for all purposes.

BACKGROUND OF THE INVENTION

A media gateway allows media to be transmitted between data terminals in different networks. A high level overview of an example application, omitting lower level details, of media transmission between two data terminals in different networks connected through a media gateway is shown in FIG. 6. Media transmission typically begins after a session is established between a data terminal A 6010 and a media Gateway, 6030, as well as a data terminal B 6110 and the media gateway, 6030, which in effect forms a media transmission channel between the data terminals A 6010 and B 6110 situated in different networks. Here the media is transmitted using quantized transportation units typically referred to as packets to the media gateway through a first network into the Incoming Buffer 6040 of the media gateway 6030. The Pass-Through module then extracts a data packet from the incoming buffer 6040 and adapts it to the format acceptable by network 2, the target network of the output channel, and places a new data packet in the outgoing buffer 6060. The packets are then sent out to network 2 6100 and received by the data terminal B 6110. The same operation is performed for the media streams in the opposite direction. For example, the data terminal A 6010 could be a video conferencing terminal operating in a SIP packet-switched network, and the data terminal B 6110 could be a terminal in a mobile network operating using a circuit-switched protocol such as 3G-324M, in this case the media gateway 6030 involves adapting the data carrying packets between a packet-switched network and a circuit-switched network.

The pass-through operation should be performed as fast as possible, as the transmission of media through the media gateway should be a transparent operation to the data terminals. One issue associated with compressed video bitstream conversion is the different packaging rules applied to media stream units in different networks. Another issue is in the delay caused by the process of fully decoding and re-encoding the media bits-stream due to the waiting necessary for sufficient data to be received to perform full decoding and re-encoding.

In digital media coding standards, media bitstreams are composed of discrete media stream units. The format of a media stream unit is related to the type of information that is produced by the video encoder. Examples of such units are macro-blocks, group of blocks (GOB), slices or slice headers. In a sophisticated media coding standard, the media stream unit contains a header, which indicates the type of information within a media stream unit. For example, in the case of the ITU-T H.264 video encoding standard, a video encoder outputs a bitstream composed of a series of units with each defined as a Network Abstraction Layer Unit (NALU), whereby different network abstraction layer units indicate different types of information within the bit-stream. The size of each NALU varies according to the NALU type and amount of information that the NALU contains.

In order for the media to be transported in the network, the media stream units are segmented and packetized into data packets before transmission. How the media stream units are segmented depends on the application performing the segmentation and the type of network transport layer carrying the media stream units. In some network transport layers, data packetization follows a strict rule on how the media stream units should be packed into the data packets before transportation can occur. Such rules can be found when the H.264 NALU is transported using the Real-Time Transport Protocol (RTP) over Internet Protocol (IP) networks. In such networks, three techniques of packaging the NALU into an RTP payload, are allowed according to the Internet Engineering Task Force (IETF) recommendation RFC3984. In the first case, one media stream unit is fitted exactly into one RTP payload packet, known as the Single Unit (SU), for transmission. The media stream unit can be too large or too small for efficient transmission over the designated network. For example, in a H.264, the Picture Parameter Set (PPS) NALU and the Sequence Parameter Set (SPS) NALU which contain the information for decoding the bit-stream is only a few bytes long, while the Slice NALU which can contain media for reconstruction of part or all of the frame can be hundreds or thousands of bytes long. In the case where the media stream unit is too large, one media stream unit is fragmented into multiple data packets. In RFC3984, the RTP packet that contains a fragment of an NALU is known as a Fragmentation Unit (FU). In the case where a media stream unit is too small, several media stream units are aggregated into one data packet for more efficient transmission. In RFC3984, the RTP packet that contains multiple NALUs is known as an Aggregation Unit (AU).

In other networks' transport layers, the mapping rule of the media stream unit to data packet may be more relaxed. The media stream units can be transmitted in sequence, separated for example by a delimiter, or the media stream unit may have an indication of the length of the packet. This can be seen when an H.264 bit-stream is transported over circuit-switched 3G mobile networks defined by 3G-324M where the H.264 Annex B byte stream format is adopted as the definition of media stream units, whereby each H.264 NALU is separated by a delimiter called a start code (SC) in the bit-stream. In the mandatory mode, there is no restriction on how an NALU is packed into data packets, known as Service Data Units (SDU), except that the first NALU of the access unit is aligned with the SDU boundary.

An issue arises when media stream units are transmitted from a network where the rules for packaging the media stream units to data packets are not strict to a network where the rules applying to packaging are strict.

Another issue that may arise in the pass through is the possibility of the video becoming non conformant due to transmission. In wireless networks, the error rate is much higher than in wired networks. When transmitting video from a wireless network to a wired network, some decoders built for wired networks may not handle errors caused by the wireless network. As a media gateway is required to handle a large variety of video clients, ensuring the conformance of the video bitstream is an important consideration.

SUMMARY OF THE INVENTION

The present invention relates to transmission of a media bitstream from one network to another through a media gateway. More specifically, embodiments of the invention are related to three areas: (1) converting a data packet which contains media stream unit in a media gateway across networks in which the rules for packaging the media stream unit within the data packet are different for the incoming and outgoing network channel, (2) decoding and re-encoding the media bitstream with in-loop filter presented in the decoder and encoder and (3) switching operation between two operations, one partially decoding and re-encoding the media bitstream to change the bitrate of the media bitstream, and one light-weight operation for data packet format adaptation.

According to an embodiment of the present invention, an apparatus performing compressed video bitstream conversion with reduced algorithmic delay is provided. The apparatus includes a pass-through module configured to re-packetize an incoming bitstream of video data. The apparatus also includes a trans-coding module configured to vary a format used to represent the incoming bitstream of video data. The apparatus further includes a switch module coupled to the pass-through module and the transcoding module.

According to another embodiment of the present invention, a method for performing compressed video bitstream conversion with reduced algorithmic delay is provided. The method includes receiving an incoming bitstream and generating a multi-state control signal. The method also includes re-packetizing the incoming bitstream in response a first state of the multi-state control signal and trans-coding the incoming bitstream in response to a second state of the multi-state control signal. The method further includes providing an output bitstream.

There are at least three parts related to embodiments of the invention. The first part specifies an apparatus and method which performs packet conversion by repackaging the media stream unit and sending out the data packet without delay and reduces the need to store incoming packets in persistent memory to wait for a complete incoming media unit for packet conversion. It also specifies a method and an apparatus of sending out the information in the current incoming data packet as an outgoing fragmentation unit data packet, and when a delimiter of the media stream unit is recognized at the beginning of the next incoming data packet, a terminating fragmentation unit data packet is sent out as the next outgoing data packet. The first part of the invention also specifies a process of packaging the media bitstream without the last few bytes of the media stream unit if the last few bytes of the media stream unit match the byte/byte sequence of the delimiter of the media stream unit, and sending it out as a fragmentation unit.

The second part of the invention specifies an apparatus and method for changing the bitstream, specifically the rates, with Reduced-Algorithmic-Delay. It contains a symmetrical in-loop filter in both the encoder and decoder, and encodes the macroblock without fully decoding a macroblock, with the deblocking operation in the encoder varying according to the deblocking parameter obtained from the incoming bitstream. In some embodiments, the methods and systems provided herein reduce the algorithmic delay to zero or levels substantially equivalent to zero.

The third part of the invention specifies an apparatus and method for switching between the Simple Pass-Through operation that involves media bitstream conversion without decoding the content of the media bitstream, and a Rate Converter that changes the bitrate of the incoming bitstream by decoding and re-encoding the media bitstream. The third part of the invention can include either the first part or the second part, or both the first and second part.

One aim of the current invention is to improve converted video quality, specifically in terms of introduced conversion delay by reducing algorithmic delay in a smart pass-through module. This quality improvement would in particular make for a more pleasant user experience.

Another aim of the current invention is to improve converted video quality by introducing rate-detection and conversion in pass-through. In an application, the bit rate of media bitstream over the bandwidth of the networks leads to media bitstream loss. This generally causes video quality to drop significantly. The addition of a rate-detection and conversion module in a pass-through can significantly improve video quality. Again, this quality improvement would in particular make for a more pleasant user experience.

Yet another aim of the current invention is to minimize, media synchronization problems. Media synchronization problems occur when the video and an associated media stream, for example the associated audio, is out of synchronization. Media synchronization is most often observed as a lip synchronization, or lip-sync problem where by the video and audio from the same source are not presented in synchrony. Lip-sync problems can be introduced in a variety of ways, in particular for media gateways where audio packets are usually small relative to the video packets, and the audio processing and adaptation, whether Pass-Through or otherwise, is fairly fast in comparison to the video processing. In this situation video data can take a longer time to propagate through the system due to higher amount of data. In an application where low-bit rate video is transmitted over the wireless channel, the video is executed at a lower frame rate, typically around 10 frames per second, and can be lower depending on network conditions. A delay of 0.1 second is significant in the media transmission and, in particular, leads to noticeable lip-sync problems. One way of keeping the bitstream synchronized is to delay the audio bitstream by caching. However, this leads to increase in memory, especially when the delay in video bitstream is not deterministic and buffer is reserved to store the outgoing audio bitstream. It is thus preferable for the video to be sent out as quickly as possible after it is received, so that synchronization between video and audio can be maintained. Again, this quality improvement would in particular make for a more pleasant user experience.

Yet another aim of the invention is to increase the execution speed of the Pass-Through process. In a media gateway that passes media stream units across different networks, multiple Pass-Through processes, possibly together with other transcoding processes which transcode media of different standards, different bit rates, different frame sizes, and/or different frame rates, may be executed at the same time. Increasing the speed of the Pass-Through process increases the number of processes that can be executed in a system with fixed resource, and thus increases the number of channels that can be handled by the system. One way to increase the speed is to reduce the memory transfers required, and this can be achieved by limiting the buffering used. When the system is implemented in a DSP-based platform, it usually contains a small but fast access internal memory, and a large but slow access external memory. In a multitasking system, each Pass-Through process may be an independent task which is executed only when an incoming data packet is received or outgoing buffer is empty, and may be temporarily halted when the incoming buffer is empty or outgoing buffer is full. While the Pass-Through process is halted, the persistent memory is usually kept in the external memory since it is larger and no frequent access is required. While the Pass-Through process is executed, the persistent memory is moved to the internal memory since the calculation requires frequent access to the memory. A larger amount of persistent memory requires additional operations to move between the external and internal memory. Reducing the persistent memory required reduces the computation and the wait time required to transfer between internal and external memory. This results in increase of process execution speed. It should also be noted that if the state is reduced to a certain point then it may be kept entirely in internal memory as its memory consumption becomes insignificant in the application. Besides reducing memory movements, another way to increase the speed is to reduce the operation requirement in the Pass-Through by using light weight operations whenever possible. This involves repackaging the media bitstream without decoding any of the content of the media bitstream whenever possible. This improvement would benefit those offering or requiring transcoding service providing systems, such as media gateways, media or content servers and the like.

Yet another aim of the invention is to reduce, and possibly eliminate the amount of large consecutive persistent memory needed for a Pass-Through process, in particular the benefit would be beneficial in a media gateway that supports multiple channels. In some systems, the buffer for persistent memory is pre-allocated before the actual Pass-Through session is started, and no dynamically allocated memory is allowed once the Pass-Through system has started execution. This generally requires that buffers for the persistent memory need to be as large enough to handle the largest incoming packet possible. When multiple channels are handled in a system, the memory requirement increases with the number of channels, and this can reduce the memory available for other processes in the system. Under a worst case, the increase in persistence memory can reduce the number of channels that can be handled by the system. This is undesirable since the channel count of the system is important to the value of a system. Reducing the persistent memory can thus free up memory, and ultimately increase the number of simultaneous channels of execution in a finite resource.

Numerous benefits are achieved using the present invention over conventional techniques. For example, in an embodiment according to the present invention, the delay of video bit-streams passing through the gateway is reduced significantly, and in most cases the delay is zero or substantially zero. Another benefit achieved by embodiments of the present invention is the improvement in perceptual quality gained for video bit-streams being trans-coded or trans-rated through the gateway by using encoder in-loop coefficients that take into account the decoder in-loop filter coefficients. Yet another benefit of the present invention is the reduction in complexity for trans-coding or trans-rating a video bit-stream through the reduction of cache misses. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

BRIEF DESCRIPTION OF THE DRAWINGS

FIGS. 1A-1D illustrate an example embodiment of packet output from Reduced-Algorithmic-Delay Media Stream Unit Conversion.

DETAILED DESCRIPTION OF SPECIFIC EMBODIMENTS

Embodiments of the present invention include methods and systems related to an apparatus for reduced algorithmic delay media stream unit conversion which is a pass-through operation as well as an apparatus and method for reduced algorithmic delay video rate conversion, which is a rate converter. The disclosed methods and apparatuses can be used separately as stand alone systems, or as part of hybrid transrater involving switching between the pass-through and the rate converter.

Figure 19:
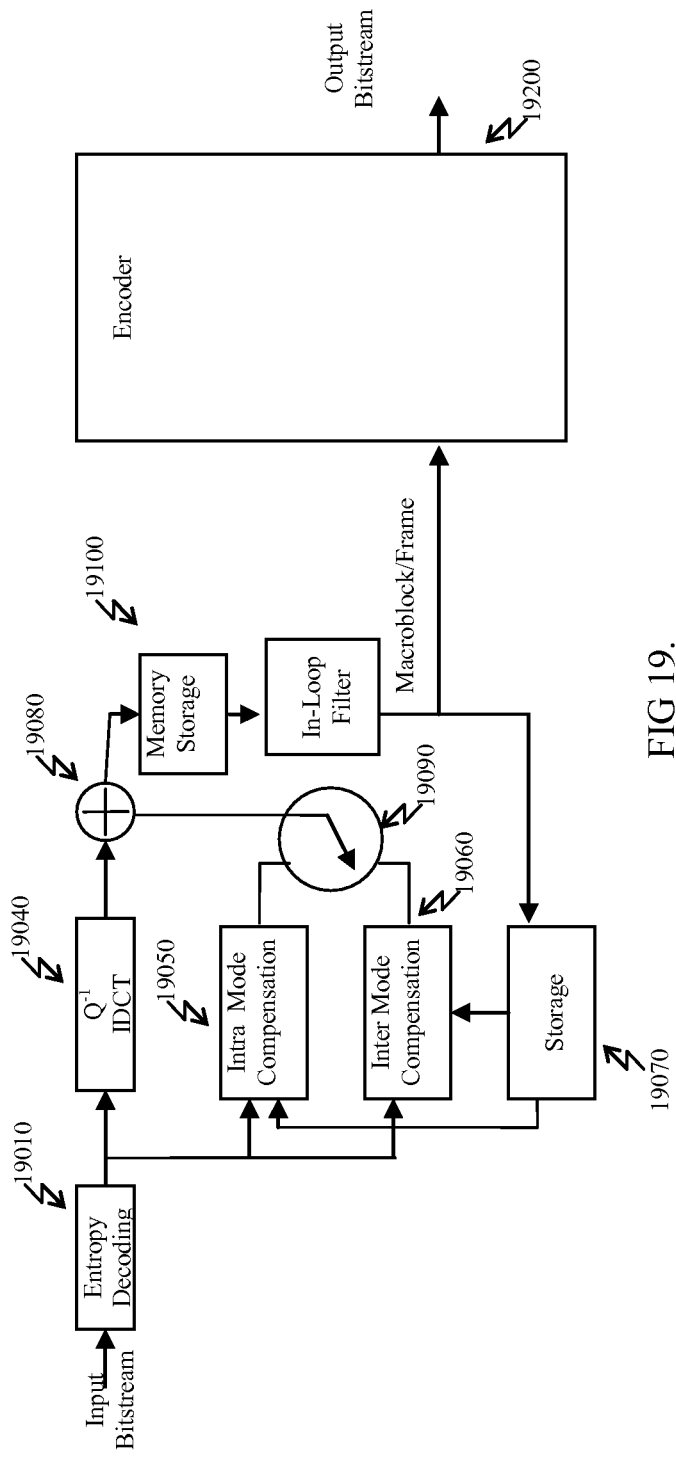
FIG. 19 illustrates a prior art of decoding and re-encoding the video bitstream in which the decoder includes an in-loop filter.

FIG. 19 shows a conventional rate control system that involves the full decoding of a macro-block or frame before re-encoding. In the case when an in-loop filter such as deblocking, shown as module 19110, is employed, a macroblock is fully decoded before it is passed into the encoder 19200. The delay in such a configuration when de-blocking is turned on is at least one row of macro-blocks or typically one frame. When low frame rate bit-streams have their bandwidth converted in this manner, a lip synch problem may arise.

In embodiments related to a simple pass-through, the apparatus and method extracts the media information from the incoming data packets and constructs new data packets. According to some embodiments, the apparatus does not need to store the incoming packets in persistent memory, and allows for zero algorithmic delay for the packet conversion. In one embodiment, if a delimiter is found at the beginning of the incoming bitstream chunk, an empty fragmentation unit is generated, and if a delimiter is not found at the end of the incoming bitstream chunk, the outgoing data packet is sent out as a fragmentation unit. In another embodiment, the last media stream unit of an incoming data packet is always sent out as a fragmentation unit.

The method and apparatus for Reduced-Algorithmic-Delay Media Stream Unit Conversion may be used as Simple Pass-Through operation within the Smart Pass-Through operation. The Simple Pass-Through operation in this context can be used as a standalone system, or used if it is part of the Smart Pass-Through operation.

The operation can be activated when a new data packet arrives at the incoming bitstream buffer, or when outgoing buffer is empty. It can also be activated by a timer, which could be triggered by software or hardware timers. In addition, it can be activated by other processes. The process searches the incoming bitstream chunk for a delimiter between the media stream units. The operation processes the incoming bitstream in chunk. Each chunk can be one or more data packets, or part of a data packet.

Figure 7:
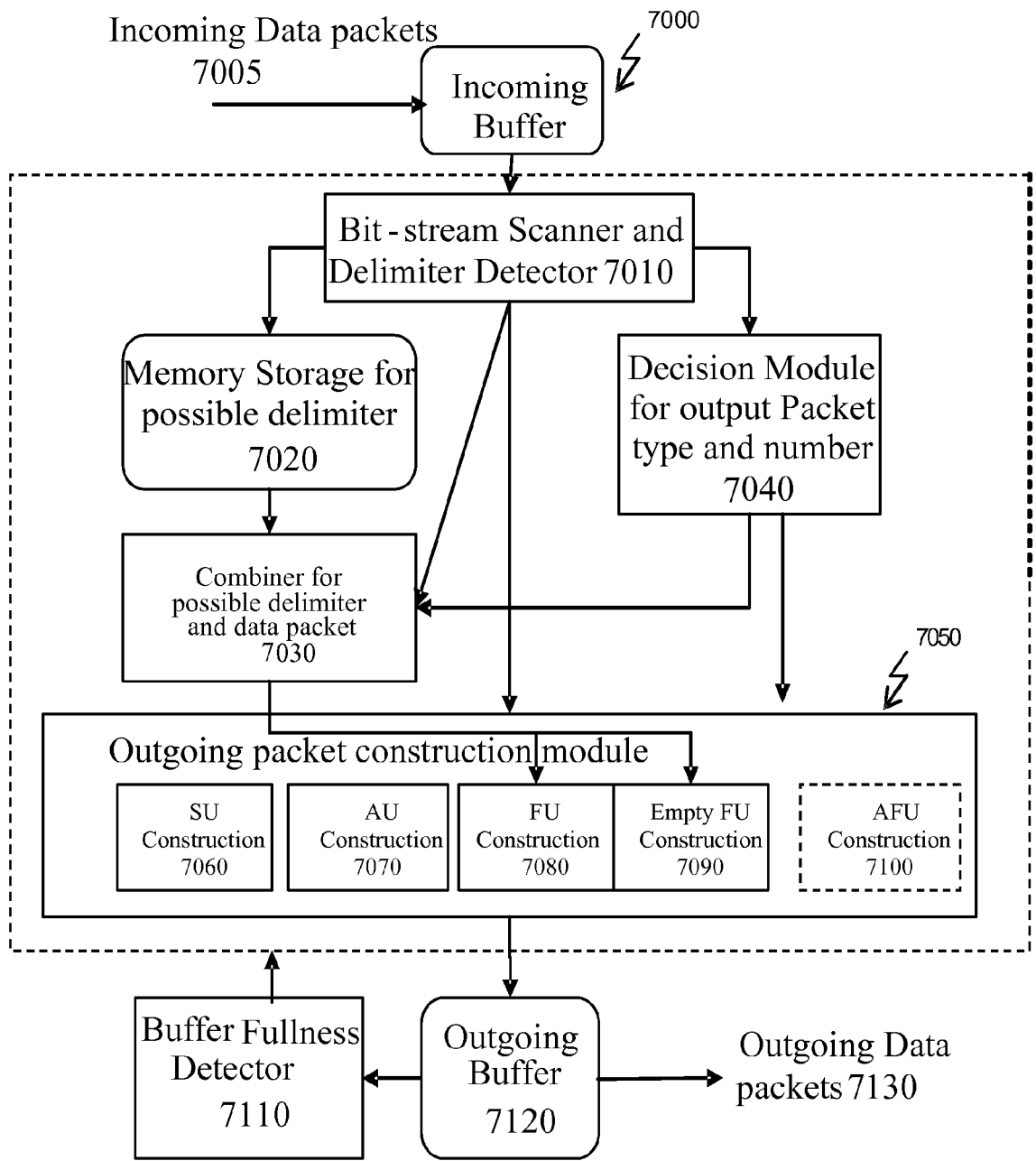
FIG. 7 illustrates an embodiment of an apparatus for the Reduced-Algorithmic-Delay Media Stream unit Conversion.

The detailed description of this embodiment of the apparatus for the pass-through having zero algorithmic delay is explained with reference to FIG. 7. The apparatus comprises several modules, as described below:

An incoming buffer 7005 which is used to store the incoming data packet when it arrives.

A bitstream scanner 7010 which extracts the information within the data packet and detects a delimiter within the data packet. The Scanner keeps a state of detection, and it is also possible for the scanner to detect if the delimiter appears across the boundary of two data packets.

A memory storage module 7020 which stores the information at the end of the data packet for possible delimiter encountered. For the simple pass-through, there are three embodiments to the storage techniques. In the first embodiment, the last few bytes with length equal to one minus the length of the delimiter sequence, is stored in the memory. In the second embodiment, the last few bytes which are detected as possible delimiter sequence from the information of the bitstream scanner is stored. In the third embodiment, if the last few bytes are detected as possible delimiter, only a single number indicating the position where a possible delimiter was is encountered at the end of the data packet. This is because the delimiter storage does not generally need to store the entire delimiter sequence at the end of the data packets since the delimiter sequence is already known to the system.

The last two embodiments use the scanner to inform whether a possible partial delimiter is encountered.

A combiner 7030 combines the incoming packet with the appropriate bitstream as indicated by the memory storage module. If the delimiter is not found, the information contained in the memory storage is combined with the bitstream in the incoming packet by the combiner. If the delimiter is not found, the operation depends on the technique used by the memory storage. If the first technique is used, the type of terminating fragment unit output depends on whether the information stored in the memory storage includes all or part of the delimiter sequence. If all of the delimiter sequence is found in the memory storage, an empty terminating FU is output. Otherwise, the bitstream corresponding to the information that is contained in the memory storage is output in a terminating FU. If the second or third techniques are used, the combiner informs the output packet construction module to output an empty terminating unit, followed by a data packet without any delimiter sequence at the start of the data packet payload.

An outgoing packet construction module 7050 which determines the outgoing data packet type according to the information of the position and number of delimiters found by the bitstream scanner and delimiter detector, as well as the response to the combiner request. It removes the delimiter in the sequence and constructs the outgoing data packet appropriately. The outgoing data packet can be of type Single Unit (SU), Aggregation Unit (AU), Fragmentation Unit (FU) or Aggregation-Fragmentation (AFU). The SU, AU and FU are defined in RFC3984 for packaging H.264 bitstreams within the RTP payload, and the concept is considered to be similar there. The AFU involves the combination of a number of media stream units as well as at least one partial media stream unit within the same data packet.

An outgoing buffer 7120 which is used to store the outgoing data packet from the outgoing packet construction module.

A buffer fullness detector 7110 which is used to estimate the bandwidth of the outgoing network. If congestion is encountered, the simple media stream unit converter is not activated to prevent further congestion. In one embodiment, it is possible to send a signal back to the source data terminal so as to reduce the bitrate of the incoming media.

Figure 5:
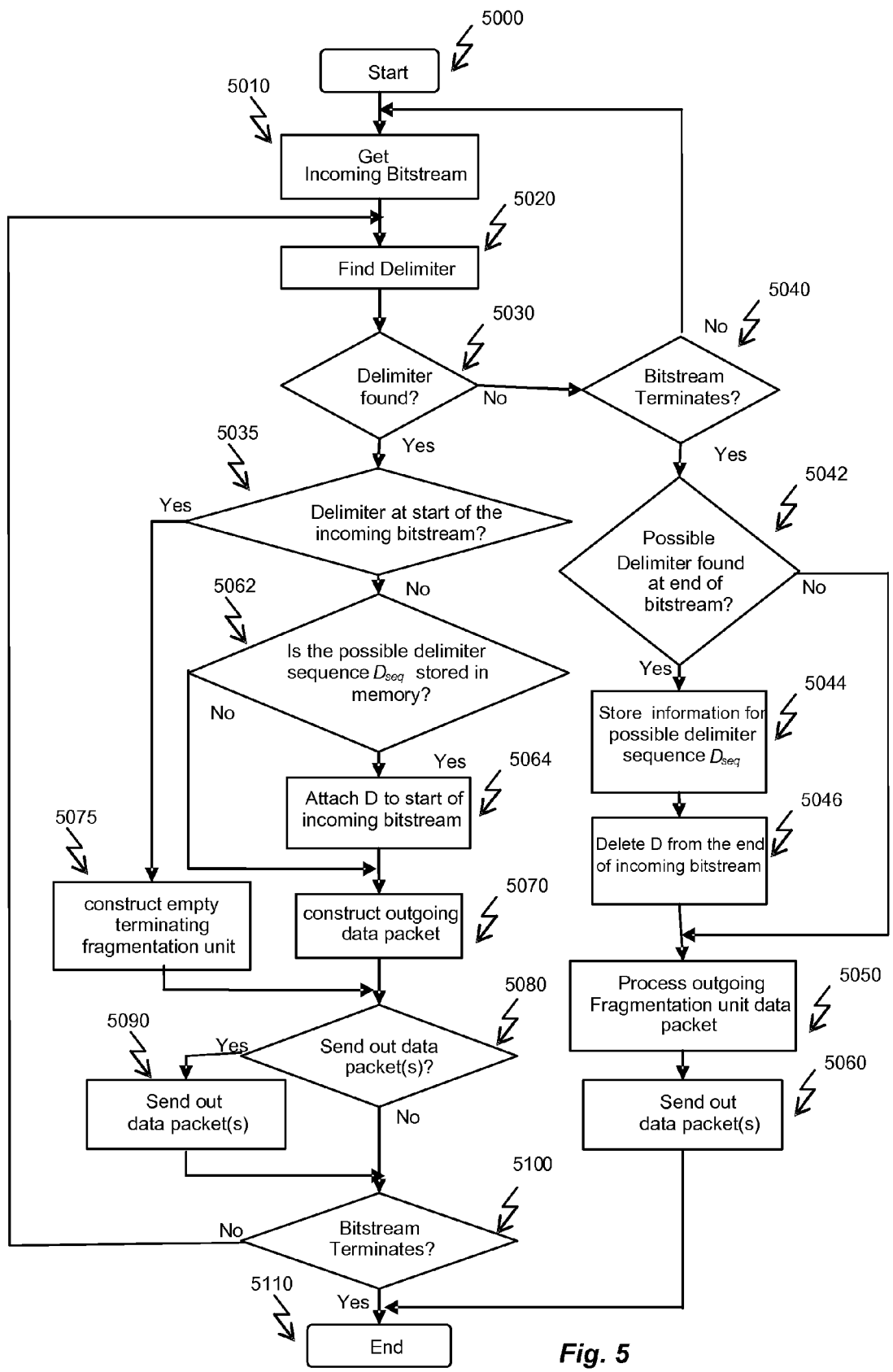
FIG. 5 illustrates an embodiment of a method for the Reduced-Algorithmic-Delay Media Stream unit Conversion.
Figure 6:
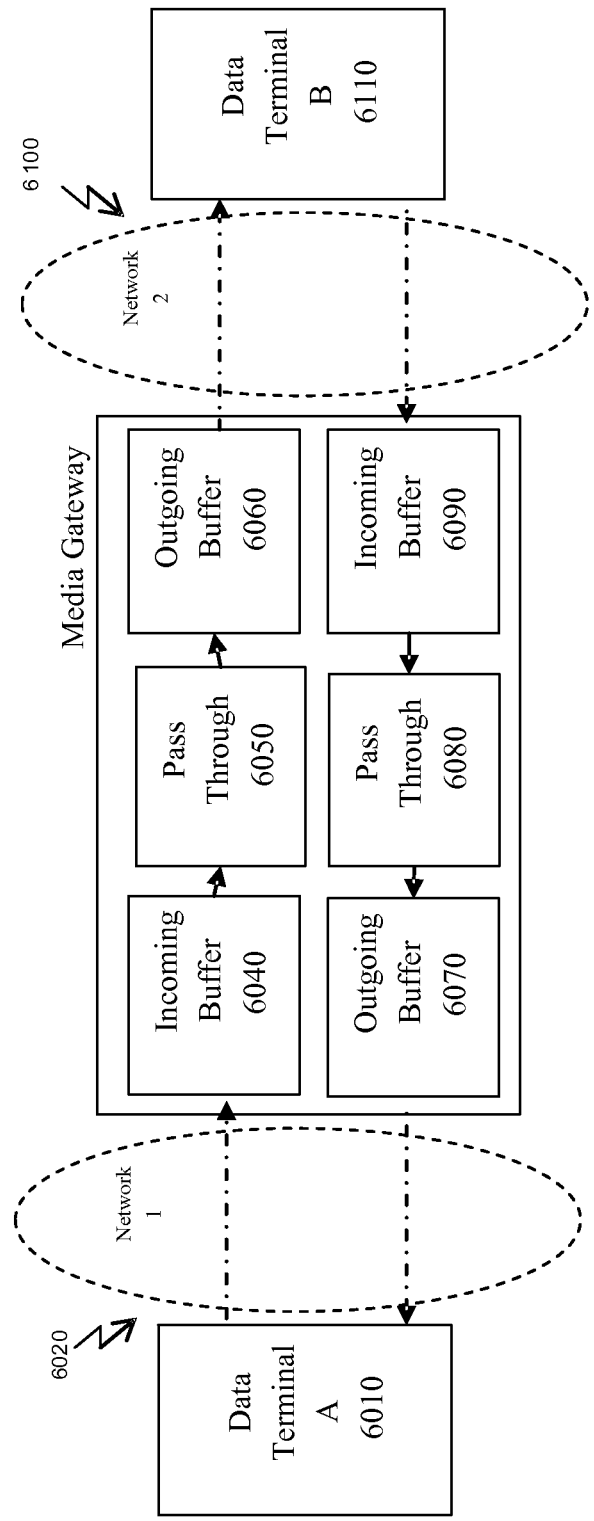
FIG. 6 illustrates the connection setup between two data terminals in different networks through a media gateway.

One detailed embodiment of the process for the method for the reduced algorithmic delay simple pass-through is explained with reference to FIG. 5. The process starts in 5000. In step 5010, the incoming bitstream is obtained from the incoming buffer. In this embodiment, the incoming bitstream contains the media bitstream without any data packet header. In one embodiment, only one incoming data packet is obtained and analyzed, while in another embodiment, more than one incoming data packet is analyzed. In yet another embodiment, the incoming bitstream contains only part of the incoming data packet. The process continues in step 5020 whereby the bitstream is scanned to find whether a delimiter is found, and the detailed embodiment of step 5020 is explained with reference to FIG. 9.

The delimiter might not necessarily be contained entirely in the current incoming bitstream, as part of it might be cached up in the previous incoming bitstream. Decision 5030 determines if a delimiter is found. If a delimiter is found, the process continues in step 5035. If a delimiter is not found, the process continues in decision 5040 to decide if the bitstream terminates. The termination is triggered when the bitstream in the incoming buffer is analyzed. If the bitstream does not terminate, the process goes back to step 5010. If the bitstream terminates, control is given to step 5042, where it is determined if a possible delimiter was found at the end of the stream. If this is so, the information on the possible delimiter sequence Dseq is stored in step 5044. There are at least two ways to store such information. In one embodiment, the technique stores all the sequences of possible delimiters. In another embodiment, only a single number indicating the position inside the possible delimiter which was is encountered at the end of the data packet is cached, instead of the entire sequence. For example, if the delimiter Dseq includes D1 D2 D3 D4, the cached number is 1 if D1 is found at the end of the bitstream, and 2 if D1 D2 sequence is found, and 3 if D1 D2 D3 sequence is found. This is continued in step 5046 whereby the sequence is removed from the bitstream. This step of removing involves marking the location where the bitstream containing the possible delimiter sequence should not be repackaged into the current outgoing data packet. In step 5050, the fragment data packet is being prepared. This involves generating the header for the fragment data packet, and updating the state variable in the system to indicate that a fragment packet has been sent. In addition, special handling could be added to handle a possible delimiter crossing the bitstream boundary. If the bits at the end of the bitstream are found to be the first few parts of the delimiter sequence, it is cached, and the outgoing data packet that is prepared does not contain the possible delimiter bitstream. This is explained in FIG. 4A, FIG. 4B, FIG. 4C and FIG. 4D.

In step 5060, the system sends out the fragment data packet. In addition, any unsent previous data packets are sent out to the network. The process of sending out the data packets involves putting the processed data packet into the outgoing buffer, in which the network transport layer handles the sending out the data packet to the network. Once the data packets are sent out, the process terminates at step 5110.

If the delimiter is determined to have been found in decision 5030, the process continues to determine if the delimiter is at the start of the incoming bitstream in decision 5035. If this is true, an empty and terminating fragmentation unit is constructed in step 5075, and the process continues in decision 5080. If this is not true, the data packets, decision 5062 is entered to determine if the delimiter sequence Dseq for previous bitstream is stored in the memory. If this is true, Dseq is attached to the start of the incoming bitstream in step 5046, otherwise step 5046 is skipped. An equivalent operation of step 5046 is to add Dseq directly to the outgoing data packet. The outgoing data packets, other than empty terminating fragmentation unit, are then constructed in step 5070. The type of outgoing data packet being constructed depends on the configuration of the system as well as previous packet type sent out. The packet type can be Single Unit (SU), Aggregation Unit (AU), Fragmentation Unit (FU) or Aggregation-Fragmentation Unit (AFU). Packet construction involves removing all delimiters before bitstream is constructed. The process then continues in decision 5080 to determine if the data packet would be sent out. In one embodiment, the system decides to always send out the data packet whenever one is available. In yet another embodiment, this decision depends on the predetermined configuration, whereby the system decides to send out the information within the incoming data packet as an aggregation unit. In this case, the system might defer the transmission of the outgoing data packet until a later stage, for example, until the incoming data packet has completely been analyzed. In yet another embodiment, the decision depends on the outgoing characteristics of the network such as the amount of congestion within the outgoing network. The data packet is sent out in step 5090 if it is decided to be sent out, otherwise the process continues in decision 5100, which decides if the bitstream terminates. If this is false, the control is given back to step 5010. Otherwise, the process terminates at 5110.

Figure 9:
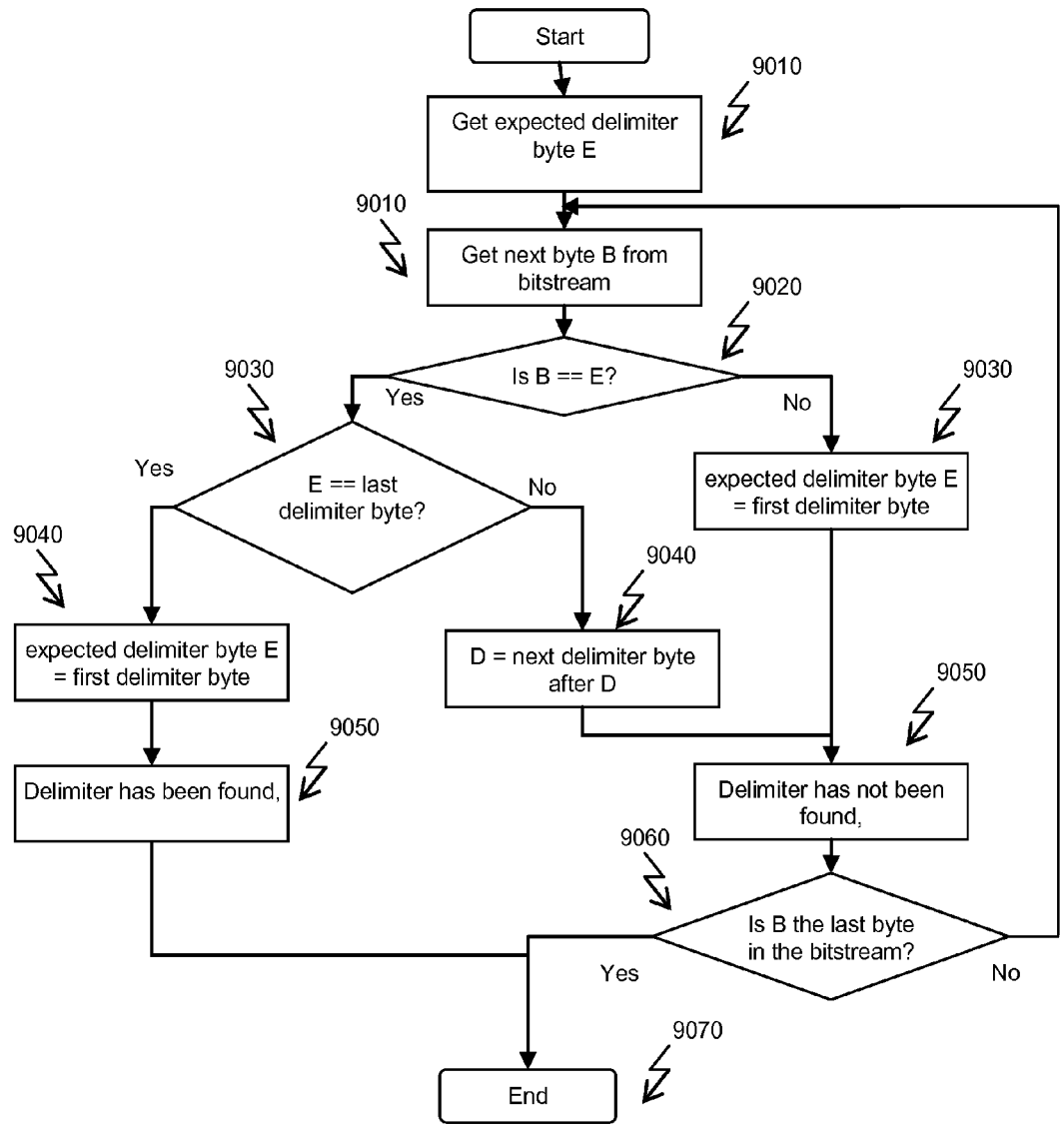
FIG. 9 illustrates an embodiment of a method for delimiter sequence detection.

The delimiter detection is explained with reference to FIG. 9. When the process first starts, the expected delimiter E is set to the first byte of the delimiter.

Figure 8:
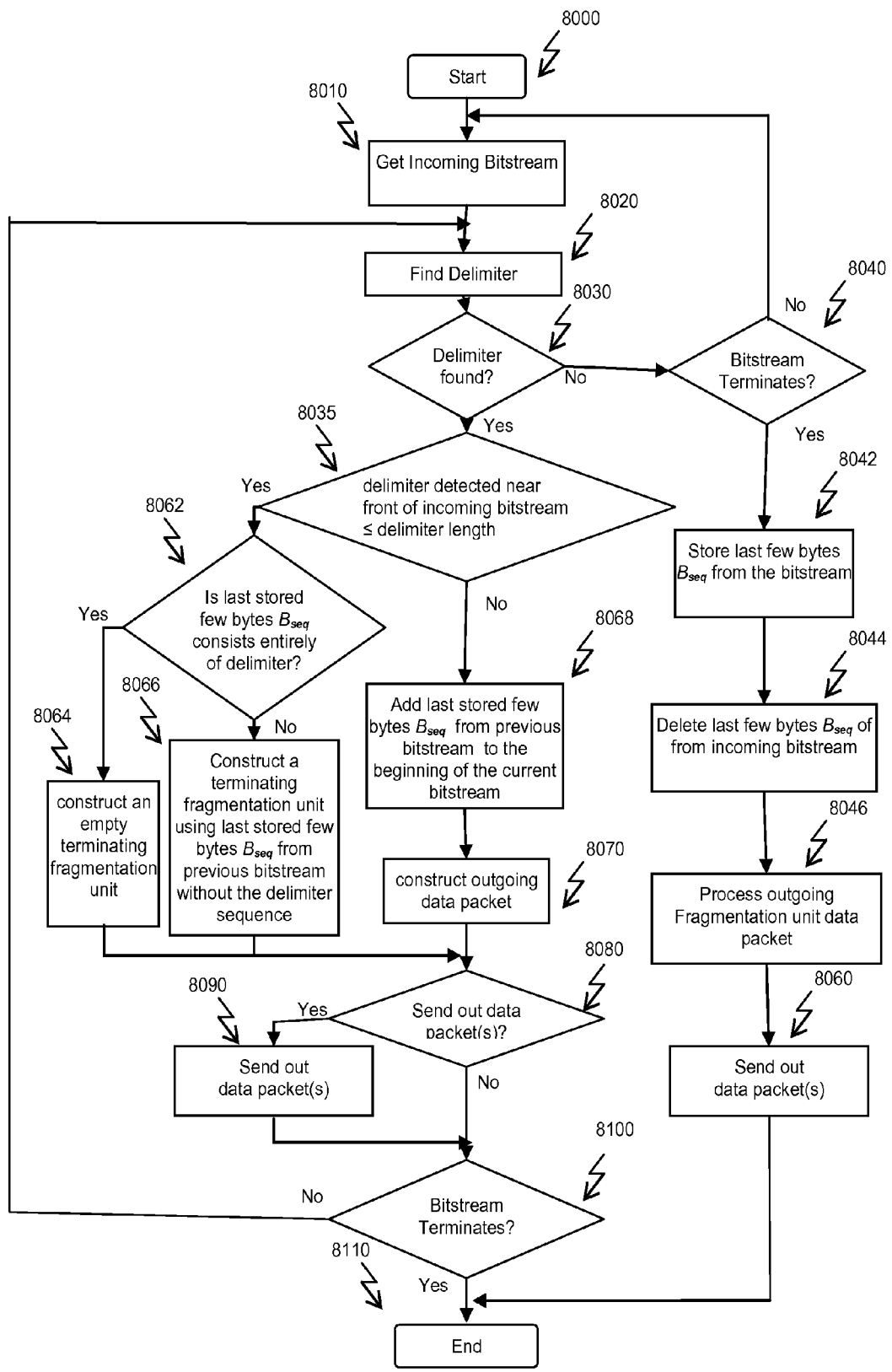
FIG. 8 illustrates another embodiment of a method for the Reduced-Algorithmic-Delay Media Stream Unit Conversion.

An alternative embodiment of the invention is explained with reference to FIG. 8. In this embodiment, the process stores the last few bytes Bseq of every incoming bitstream in step 8042, deletes Bseq in step 8044, and sends out the data packet without Bseq in step 8046. The length of the Bseq is one byte less than the length of the delimiter. In the case when the delimiter is of length 4, the last three bytes are stored. For the next incoming bitstream, a decision is made if it is near the start of incoming bitstream, and it outputs true if the delimiter is detected within the first few bytes of the incoming bitstream which is less than or equal to the length of the delimiter. If this case is found, the process continues in decision 8062 to determine if the Bseq includes all delimiter bytes. If it is true, an empty terminating fragmentation unit is sent out in step 8064. Otherwise, only delimiter byte is included partially in Bseq, a terminating fragmentation unit is constructed using Bseq with the delimiter removed is constructed in step 8066. Other steps and decisions in the process such as 8000, 8010, 8020, 8030, 8035, 8040, 8070, 8080, 8090, 8100 and 8110 in FIG. 8. perform the same operations as respective steps and decisions 5000, 5010, 5020, 5030, 5035, 5040, 5070, 5080, 5090, 5100 and 5110 in FIG. 5.

One example of the incoming packet for encapsulation of media stream unit and the equivalent outgoing packet is illustrated with reference to FIG. 1A. In this example, the media stream units are represented by the narrower rectangles, as indicated by 1100, 1102, 1110, 1120, 1130, 1140, 1150, 1160, 1170, 1180, 1190. The data packets in which the media stream units are encapsulated are represented by wider rectangles, as indicated by 1000, 1010, 1020, 1030, 1040, 1050 and 1060. The network packets are separated by delimiter, as indicated by 1101, 1105, 1115, 1125, 1135, 1145, 1155, 1175, 1185, 1195 as well as the byte sequence 1165 and 1166 which form a delimiter and splits over two data packets 1150 and 1160. In this example, one or more outgoing data packets are generated after an incoming data packet is received, without analyzing the next incoming data packet. Thus, the size of an outgoing data packet is equivalent to or less than that the incoming data packet size, and each packet is output as a fragmentation unit. The rule of the outgoing network for packaging the media stream unit to data packet is restricted, and at least three types of packets can be generated: The simple unit (SU) where one data packet contains exactly one media stream unit; the fragmentation unit (FU) where one data packet contains one or part of one media stream unit; the aggregation unit (AU) where one data packet contains multiple media stream units; the aggregation-fragmentation (AFU) unit where one data packet contains multiple media stream unit as well as part of media stream units. For the first three types of unit, a similar concept is defined in RFC3984 for H.264 RTP payload format.

There are many possibilities for the outgoing packets, depending on the type of outgoing data packet the system selected. Three possibilities are explained here.

This first possibility that the outgoing packet contains no aggregation units is illustrated with respect to FIG. 1B. When incoming data packet 1000 is received, a delimiter 1101 is found at the end of the data packet, and the media stream unit 1100 is sent out as a single unit data packet 1200. When data packet 1010 is received, one delimiter 1105 is found in the middle of the packet, the first media stream unit 1102 is sent as a single unit 1202 and the other media stream unit 1110 is sent as a fragmentation unit 1210. When the data packet 1020 is received, the delimiter 1115 is found at the end of the data packet. The media stream unit information in data packet 1020 is repackaged in data packet 1220 and sent out as a terminating fragmentation unit. When data packet 1030 is received, there is no delimiter found, and the system cannot determine if this packet contains a single data packet. The media stream unit 1120 is then repackaged and sent out as a fragmentation data packet 1230. When the data packet 1040 is received, one delimiter is found at the beginning of the data packet. This signifies the end of media stream unit 1120 in the data packet 1030 last received. An empty terminating fragmentation unit 1235 is being sent out which terminates the media stream unit 1320 in the data packet 1230 that was last sent out. Following that, a fragmentation unit data packet 1240 that contains the media stream unit 1330 which corresponds to the media stream unit 1130 is sent out. When data packet 1050 is received, four delimiters are found. The first delimiter 1135 is found at the beginning of the data packet 1050, and this indicates that the previous media stream unit 1330 terminates. An empty terminating fragmentation unit 1245 is sent out. The next two delimiters 1145 and 1155 are within the packet and the media stream unit information 1140 and 1150 are being repackaged in the outgoing single unit network package 1250 and 1252. Finally, part of the delimiter sequence 1165 is found. Since a complete delimiter sequence is not detected, the system cannot determine if this is the actual delimiter. The media stream unit in 1160 is repackaged as 1360 without the delimiter sequence part, and sent out as a fragmentation unit data packet 1254. The repackaging is further explained with reference to FIG. 4. When data packet 1060 is received, the rest of the delimiter sequence 1166 is found at the beginning of the data packet, and when combined with partial delimiter sequence 1165, form a complete delimiter. A terminating empty fragmentation unit 1255 is sent out. Following that, three delimiters 1175, 1185 and 1195 are found. Three single unit data packets 1170, 1180 and 1190 are sent out.

This second possibility is that aggregation unit is used in the outgoing data packet. In this example, the aggregation unit is constructed for the outgoing packet corresponds to the incoming data packet whenever possible, thus the system does not keep the incoming data packet in the persistent memory.

This second possibility is that the aggregation units are used in the outgoing packet, and outgoing packets generated are explained with respect to FIG. 1C. Here, the outgoing data packets 1400, 1402, 1410, 1420, 1430, 1435, 1440, output when the corresponding incoming packets 1000, 1010, 1020, 1030, 1040 are received, are generated in the same fashion as that when aggregation units are not used. When data packet 1050 is received, four delimiters are found. The first delimiter 1135 is found at the beginning of the data packet 1050, and this indicates that the previous media stream unit 1530 contains in outgoing data packet 1440 terminates. An empty terminating fragmentation unit 1445 is sent out. The next two delimiters 1145 and 1155 are within the packet and the media stream unit information 1140 and 1150 are being repackaged in a single aggregation unit data packet 1450. Finally, part of the delimiter sequence 1165 is being found. The media stream unit is 1160 is being repackaged as 1560 without the delimiter sequence part, and sent out as a fragmentation unit data packet 1454. When data packet 1060 is received, the rest of the delimiter sequence 1166 is found at the beginning of the data packet, and when combined with partial delimiter sequence 1165, form a complete delimiter. A terminating empty fragmentation unit 1455 is being sent out. Following that, three delimiters 1175, 1185 and 1195 are found. A single aggregation unit data packet 1460 is sent out.

This third possibility is that the aggregation units are used in the outgoing packet, and outgoing packets generated are explained with respect to FIG. 1D. Here, the outgoing data packets 1600, 1610, 1620, 1630, 1630, 1640, output when the corresponding incoming packets 1000, 1010, 1020, 1030, 1040 are received, are generated in the same fashion as that when aggregation units are not used. When data packet 1050 is received, four delimiters are found. The first delimiter 1135 is found at the beginning of the data packet 1050, and this indicates that the previous media stream unit 1730 contains in outgoing data packet 1640 terminates. An empty terminating fragmentation unit 1645 is sent out. The next two delimiters 1145 and 1155 are within the packet and the media stream unit information 1140 and 1150 are being repackaged in a single aggregation unit data packet 1650. Finally, part of the delimiter sequence 1165 is being found. The media stream unit is 1160 is being repackaged at the back of 1650, and sent out as an aggregation-fragmentation unit data packet. When data packet 1060 is received, the rest of the delimiter sequence 1166 is found at the beginning of the data packet, and when combined with partial delimiter sequence 1165, form a complete delimiter. A terminating empty fragmentation unit 1455 is being sent out. Following that, three delimiters 1175, 1185 and 1195 are found. A single aggregation unit data packet 1660 is sent out.

Special handling is used when a byte sequence corresponding to part of the delimiter sequence is found at the end of a data packet. In this example, the delimiter includes four unique bytes as indicated by 4000 with reference to FIG. 4A. One embodiment determines the occurrence of byte sequence by using a state variable. For each time the byte is analyzed, if its value matches the next delimiter byte expected, the state variable is incremented by one. Otherwise, the state variable is reset to zero. If all the delimiter bytes are found in the correct order, the delimiter is equal to the length of the delimiter sequence. If this is the case the delimiter in the media bitstream is found and the media package boundary is identified. Another embodiment to detect the delimiter sequence is illustrated with reference to FIG. 9. The delimiter is removed from the media stream before it is packaged into the outgoing data packet. Special handling is thus used when the delimiter byte sequence crosses the boundary of the incoming data packet. Such handling is illustrated with reference to FIG. 4B and FIG. 4C. In these examples, the start of the delimiter sequence is encountered at the end of the incoming data packet. If the next incoming packet is not received, it is not known whether the next few bytes contained in the start of the next incoming packet together with last few bytes at the end of the current incoming data packet form a delimiter. The information of the byte sequence that resembles the start of delimiter is cached, and the bitstream before this sequence is sent out as a fragmentation unit. If the next incoming data packet is found to contain the rest of the delimiter sequence, a terminating empty fragmentation unit is sent out, and the delimiter byte sequence is removed from the media bitstream, and the following data packet starts with the media byte stream that is followed after the delimiter. Otherwise, the byte sequence that resembles the start of the delimiter is appended to the beginning of the payload within the data packet, and the data packet is sent out as a fragmentation unit. This ensure that the incoming packets are sent out as fast as possible, and limited buffering is required for the pass through operation.

Figure 4A:
FIGS. 4A-4D illustrate a method for handling of a delimiter at the end of a data packet according to an embodiment of the present invention.
Figure 4B:
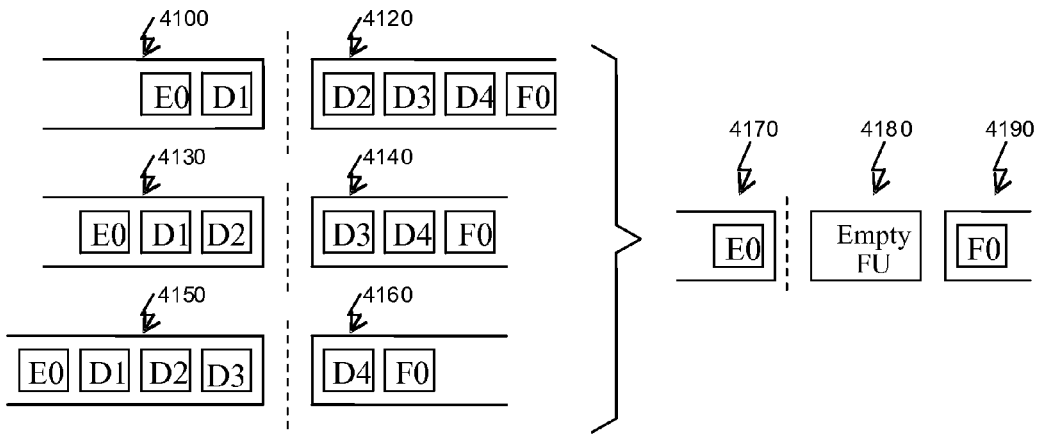

Yet another embodiment is explained in detail with reference to FIG. 4B. Here, the incoming packets can be one of three possibilities. In the first case, the delimiter byte D1 is contained in the end of first incoming data packet 4100, and the rest of the delimiter D2, D3, D4 is contained in the start of the next incoming data packet 4120. In the second case, the delimiter byte D1, D2 is contained at the end of first incoming data packet 4130, and the rest of the delimiter D3, D4 is contained at the start of the next incoming data packet 4140. In the third case, the delimiter byte D1, D2, D3 is contained at the end of first incoming data packet 4150, and the rest of the delimiter D4 is contained at the start of the next incoming data packet 4160. When the first incoming data packet arrives, any one of the data packets 4100, 4130 or 4150, is received and in each respective case, whilst the first part of the delimiter is being detected, the fragmentation unit data packet 4170 is sent out on the outgoing network. Upon receiving the next respective incoming data packet 4120, 4140 or 4160, the bytes at the beginning of the respective next incoming data packet are confirmed to form a delimiter with the bytes at the end of the respective previous incoming data packet. The boundary of the media stream unit is recognized, and the delimiter byte sequence is removed from the bitstream. An outgoing data packet 4190 is formed from the bitstream after the delimiter.

If the next incoming data packet is found not to contain the rest of the delimiter sequence, the boundary of the media stream unit is not found. The outgoing data packet is a fragmentation unit which contains the cached byte sequence appended in front of the media byte stream that is in front of the next incoming data packet.

Figure 4C:
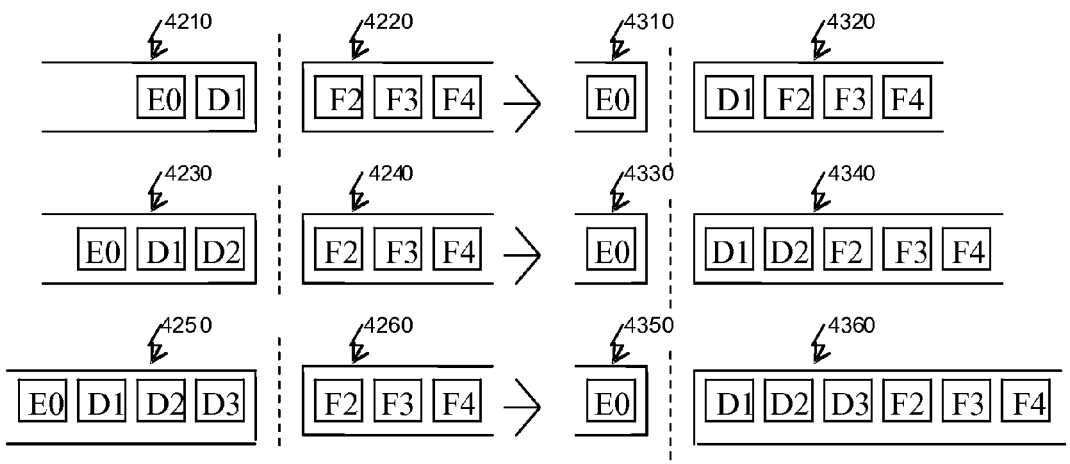
Figure 4D:
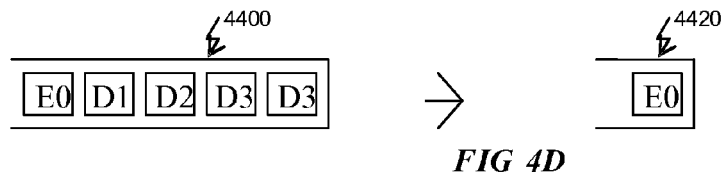

A further embodiment is explained in detail with reference to FIG. 4C. Here, the incoming packets can be one of three possibilities. In the first case, the delimiter byte D1 is contained at the end of first incoming data packet 4100, and the outgoing data packet 4310 which contains the bit-stream before the delimiter byte is sent out after detecting the delimiter byte. When the next incoming data packet which begins with byte sequence F2 F3 F4 is received, it is found that the byte sequence D1 F2 F3 F4 does not form a delimiter. Thus the D1 byte which is cached is inserted at the beginning of the incoming byte sequence and the bit-stream is sent out in the outgoing data packet 4320 as a fragmentation unit.

In the second case, the delimiter byte sequence D1 D2 is contained at the end of first incoming data packet 4230, and the outgoing data packet 4330 which contains the bit-stream before the delimiter byte is sent out after detecting the delimiter byte. When the next incoming data packet which begins with byte sequence F2 F3 F4 is received, it is found that the byte sequence D1 D2 F2 F3 does not form a delimiter. Thus the D1 D2 byte sequence which is cached is inserted at the beginning of the incoming byte sequence and the bit-stream is sent out in the outgoing data packet 4340 as a fragmentation unit.

In the third case, the delimiter byte sequence D1 D2 D3 is contained at the end of first incoming data packet 4250, and the outgoing data packet 4350 which contains the bit-stream before the delimiter byte is sent out after detecting the delimiter byte. When the next incoming data packet which begins with byte sequence F2 F3 F4 is received, it is found that the byte sequence D1 D2 D3 F2 does not form a delimiter. Thus the D1 D2 D3 byte sequence which is cached is inserted at the beginning of the incoming byte sequence and the bit-stream is sent out in the outgoing data packet 4360 as a fragmentation unit.

If the end of the data packet contains the entire delimiter sequence, the boundary of the media stream unit is reached. The delimiter sequence is removed and the bit-stream before the delimiter is packed in the outgoing data packet as a non-fragmentation unit, for example, a simple unit or aggregation unit.

There are multiple methods in which the media stream unit can be identified in the bit-stream. Three examples follow. Firstly, the position of each media stream unit is indicated by an index recorded in the bit-stream. Secondly, the length of each media stream unit is recorded in the bit-stream. Thirdly, a delimiter is placed in between each media stream unit. Embodiments of the invention are targeted at bit-streams in which media is separated by a delimiter.

In the context of RFC3984, the delimiter is the start code defined in the H.264 standard, which is represented by four consecutive bytes: HEX(00 00 00 01), which corresponds to the delimiter D1 D2 D3 D4 explained in the example.

In the second embodiment of the present invention, the reduced algorithmic delay video rate converter allows a macro-block that is partially decoded to spatial domain and is not filtered fully by the in-loop filter to be output for re-encoding. The apparatus includes two in-loop filters, one is in the encoder, and another is in the decoder. It is possible that the macro-blocks that decoded from the rate converter look similar, regardless of whether it is filtered by the in-loop filter in the decoder before being encoded by the encoder in the rate converter. In a specific embodiment, two situations are typically satisfied. Firstly, the two in-loop filters are symmetrical, i.e. they perform exactly the same operation given the same input. In the preferred embodiment, the same logic or procedure is used for the filtering in the decoder as well as the encoder. Secondly, a similar amount or more filtering is performed in the encoder as in the decoder. In the H.264 de-blocking filter, this means that the threshold $\alpha$ and $\beta$ used in de-blocking decision, affected by both the quantization parameter set, and the de-blocking parameter such as FilterOffsetA and FilterOffsetB in the encoder is equal to or higher than that of the decoder. In this way, the de-blocking filter of the encoder actually "compensates" for the de-blocking filter in the decoder. Even though macro-blocks output from the decoder need not be filtered, the in-loop filter is still used to construct the reference frames within the decoder.

The filtering strength of a pixel in the encoder is stronger than the filtering strength of the pixel of the same location in the decoder if more filtering is being applied in the encoder than in the decoder for that particular pixel. In general, the filtering strength for a pixel is considered to be stronger if it affects more pixels during the filtering.

Sometimes it is difficult to ensure that filtering strength is always stronger in the encoder than the decoder for every pixel, due to restrictions in the encoding for some video codecs. In one embodiment, the filter strength of the encoder is said to be stronger than that of the decoder if the logic is applied such that on average, the filtering strength of the encoder for most pixels are stronger than that applied to the pixel in the same spatial location in the decoder. In yet another embodiment, the filter strength of the encoder is said to be stronger than that of the decoder if the logic is applied such that on average, the filtering strength applied to most pixels that are found to have higher visible artifacts in the encoder are stronger than that applied to the pixel in the same location in the decoder.

The present invention can also be applied to trans-coding video between different standards, which uses different filters. It is possible for the filtering to be asymmetrical, that is, the logic used in the in-loop filtering of the encoder and that in the decoder are different, as long as the filtering strength of the encoder is greater than that of the decoder, such that the filtering effect in the encoder can compensate for the quality reduction of using the pre-filtered frame extracted from the decoder.

In the de-blocking filter of many video codecs, the pixel is filtered and the type of filtering (3, 4 or 5 tap filter) that is applied on it depends on various factors, or a combination of various factors. Some of these factors are:

1. The type of boundary it is close to, whether it is a block or macro-block boundary
2. The Quantization Parameter, and additional parameter that shifted the Quantization Parameters (such as Alpha and Beta in H.264)
3. The type of Macro-block (P or I)
4. Whether the block contains transform coefficients.
5. Inter macroblock modes.
6. Existence and direction of motion vectors, in the case of P and B blocks.

The strength of the filtering can thus be affect by various factors, and the present invention requires that the encoding parameters be adjusted such that the filtering strength in the encoder is more than that in the decoder. The simplest case can be demonstrated by looking at H.264 transrating. In one embodiment, the macro-block type, slice group, intra/inter prediction mode remain the same in the trans-coded bitstream, and only the Quantization Parameter (QP) for each macro-block, and the de-blocking parameters FilterOffsetA and FilterOffsetB of each slice vary. In the case where most of the parameters are transferred, the H.264 de-blocking decision in both the encoder and decoder is controlled by internal thresholds $\alpha$ and $\beta$ that varies with QP as well as the respective FilterOffsetA and FilterOffsetB. In this case, FilterOffsetA and FilterOffsetB have to be set in the encoder such that it produces the respective $\alpha$ and $\beta$ (related to the strength of the filter) which is higher than the $\alpha$ and $\beta$ for de-blocking used in the decoder. In a further embodiment, the QP of each macro-block within the slice has to be controlled such that the condition is satisfied most of the time. In some cases, the macro-block type for some of the macro-blocks within a slice changes, and QP is required to change in order to maintain reasonably quality.

In another embodiment, the QP is varied for rate control purposes, and is not being controlled by de-blocking parameters in the decoder. In this case, FilterOffsetA and FilterOffsetB in the slice has to be adjusted such that it produces $\alpha$ and $\beta$ values in the encoder which is higher than the $\alpha$ and $\beta$ values in the decoder for all or most of the time.

The apparatus and method for the reduced algorithmic delay video rate converter is used as a rate converter within the hybrid transrater. The rate conversion in the context here can be used as a standalone system, or used as a part of the Hybrid Trans-rater.

Figure 12:
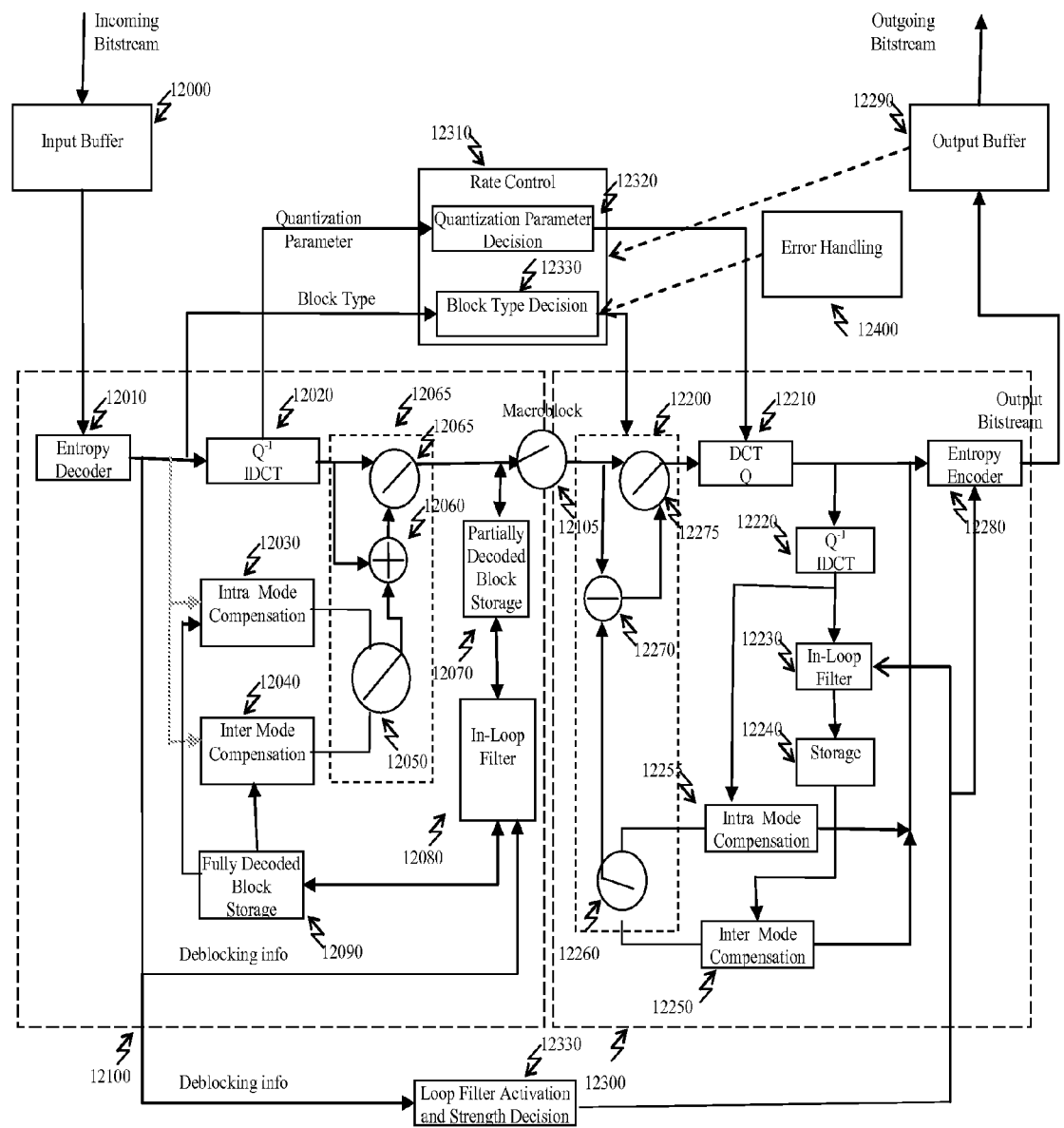
FIG. 12 illustrates an embodiment of an apparatus for Reduced-Algorithmic-Delay Video Rate Conversion Operation.

One embodiment of the apparatus is explained with reference to FIG. 12, and the main modules of the apparatus are:

Full Video Decoder 12100: This includes an Entropy Decoder 12010, inverse transform and inverse quantization module 12020, memory storage 12070 for storing partially decoded blocks, memory storage 12090 for fully decoded blocks. Inter mode compensation unit 12040 which includes a motion compensation function, Intra mode compensation unit 12030. The partially decoded block storage and fully decoded block storage can occur in the same consecutive memory space. The in-loop filter 12080 uses the information of the blocks in the fully decoded block storage for de-blocking operation. A few possible embodiments to this aspect of the invention are considered here. In the first embodiment, the partially decoded block without any filtering is sent directly to the encoder. In another embodiment, the partially decoded block is filtered by the in-loop filter using only previously received macro-blocks. In yet another embodiment, the partially decoded macro-block that is filtered using the information of the macro-blocks contained in the same data packet that it is decoded from. In this case, all the macro-blocks within the current data packet are partially decoded, filtered by the in-loop filter when possible, before they are sent out altogether to the encoder for encoding.

An optional switch 12105. This is used when the rate converter is used within the hybrid trans-rater. It enables the output to the Encoder, and is turned off when the operation is switched to simple Pass-Through. When the rate converter is used as a stand alone module, the switch may not be present or may always be turned on. In addition, it is also used in one of the embodiment when all the macro-blocks in the same entity are decoded in batch before they are sent to the encoder as a batch. In this case the switch is turned off until the last decodable macro-block in the entity has been decoded.

Video encoder 12300: It includes a block type decision module 12200, transform and quantization module 12210, inverse transform and quantization module, storage for reference frame 12240, the inter mode compensation unit 12250 and intra mode compensation unit 12255. The encoder in-loop filter 12230 is symmetrical to decoder in-loop filter 12080, that is, they perform the same operation if given the same input.

Rate Control Module 12310: This includes a Decision module 12330 to select the block type, and Decision module 12320 to select the quantization parameter. The quantization parameter of the encoded block is set to be, on average, equal to higher than the quantization parameter of the decoded block if the block types of the incoming and outgoing block are the same. If the block types are different, the quantization parameter decision module tabulates the outgoing quantization parameter. The quantization parameter decision module also takes into consideration the de-blocking operation in the in-loop filter. It is possible for the block type to be different, when the rate control module dictates to change an I macro-block to a P macro-block to reduce the outgoing bitrate, or when error handling 12400 decides to change a P macro-block to an I macro-block, to refresh an error reported by the destination terminal.

In-loop filter activation and parameter decision 12330: This module obtains the de-blocking information from the decoder, and decides whether the de-blocking should be turned on, and if so, its position and respective strength. In one embodiment, the strength of the in-loop filter in the encoder is set to be exactly the same as the decoder. In another embodiment, when it is found that the de-blocking is used in the decoder, the de-blocking strength in the encoder is set to be higher than the strength used for de-blocking in the decoder.

In this apparatus, the inter mode compensation unit and intra mode compensation unit in the encoder obtained information from the decoder for inter mode and intra mode prediction.

Figure 3:
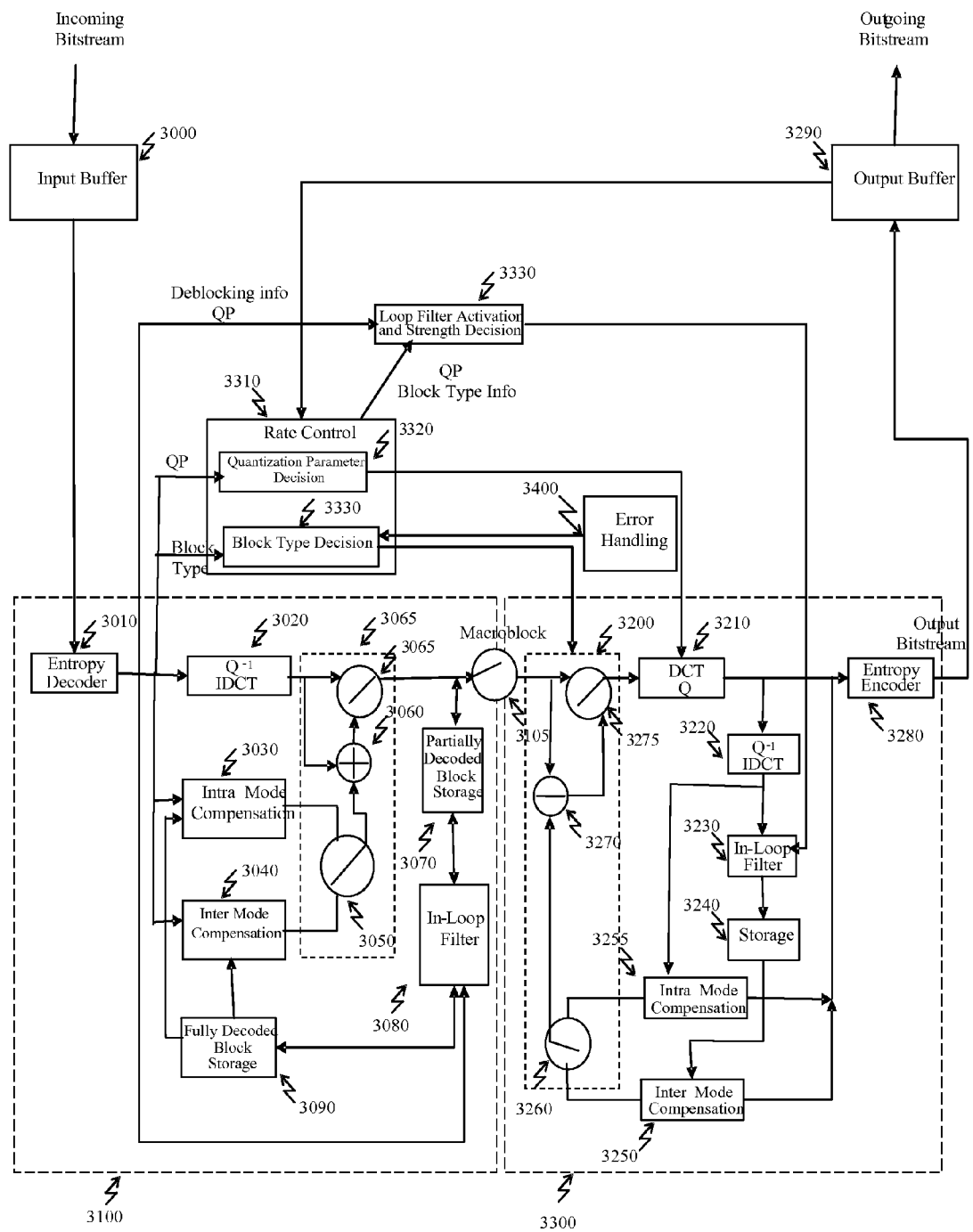
FIG. 3 illustrates an embodiment of an apparatus for Reduced-Algorithmic-Delay Video Rate Conversion Operation.

Another embodiment of an apparatus for Reduced-Algorithmic-Delay Video Rate Conversion Operation is illustrated in FIG. 3. Here, the most modules illustrated with reference to FIG. 3 have the same functionality as the respective similar modules illustrated with reference to FIG. 12, except that the Loop Filter Activation and Strength Decision module 3330 takes the deblocking information and quantization parameter of the incoming bitstream from the decoder as well as other information such as quantization parameter, block type information of the output bitstream directly from Rate Control Module 3310.

There are many ways for transferring the information, some of which might be obvious to those skilled in the art.

Figure 20:
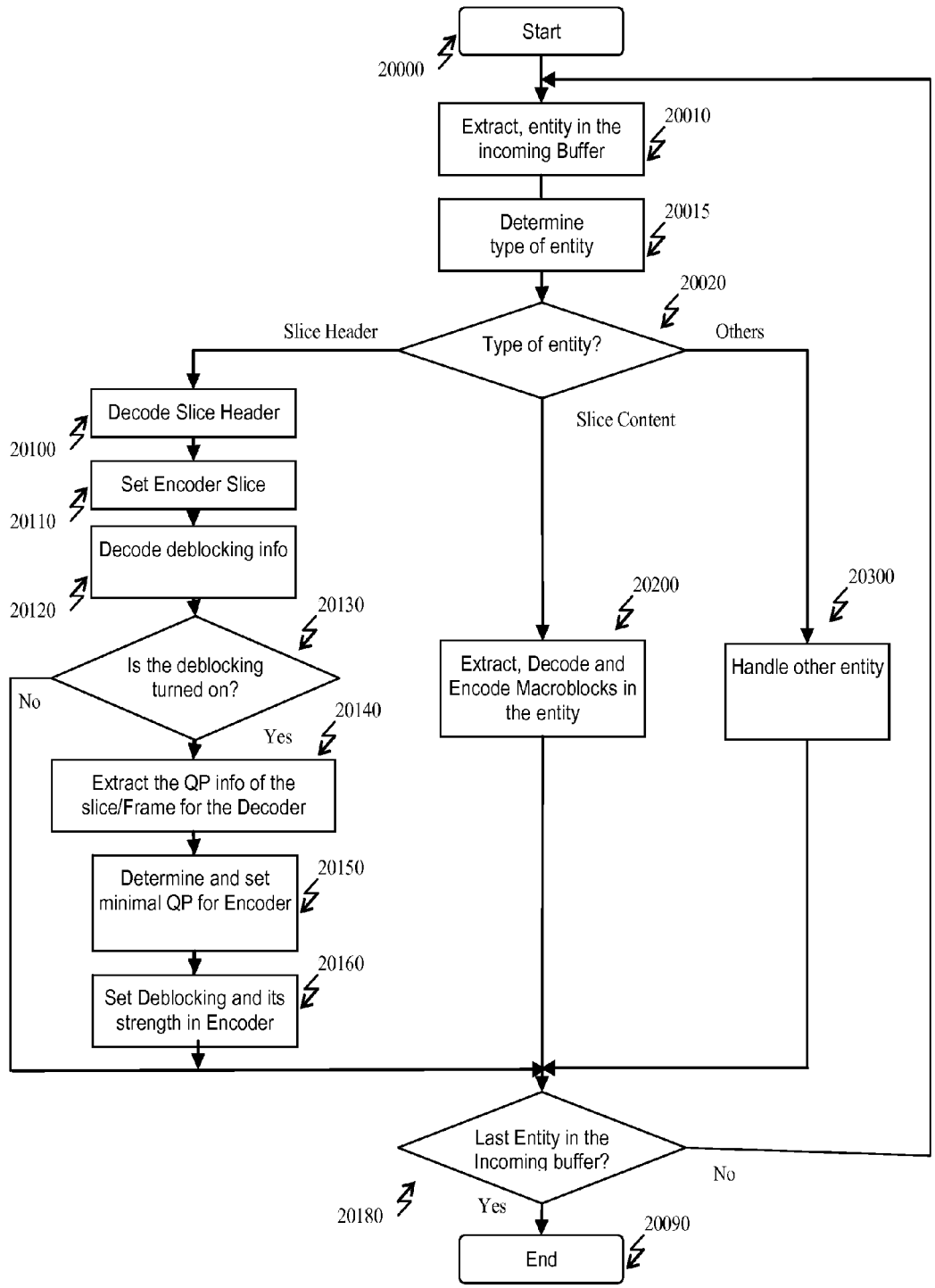
FIG. 20 illustrates an embodiment of a method for Reduced-Algorithmic-Delay Video Rate Conversion Operation.

The process of reduced algorithmic delay video rate converter involves partially decoding the macro-blocks in the entity but not performing all of the de-blocking operation, and sending the macro-blocks to the encoder for re-encoding. A detailed embodiment of the process is explained with reference to FIG. 20. To start with, an entity is extracted from the input buffer. The entity is the media bit-stream that is being placed in the incoming buffer, which includes media stream unit, or a fragmentation unit that contains only part of media stream unit. The header of the data packet or fragmentation unit is then read in step 20015 to determine the type of entity, whether it is a slice header, or contains slice content, or neither. If it contains a slice header, the information of the slice header is analyzed, and new slice is created in the outgoing bit-stream in the encoder in 20110. The de-blocking information is decoded in the slice header in step 20120, and this information is used in encoder to de-block the outgoing macro-blocks. The technique is employed to extract de-blocking information from H.264 bit-stream, the de-blocking information is stored in the slice header, and de-blocking is controlled at the slice level. In another embodiment the de-blocking information is not stored in the slice level, and the extraction of information from the appropriate location in the entity. After the de-blocking information is extracted, and if the de-blocking is turned on, the QP from the frame or slice is extracted from the decoder and minimal QP and de-blocking parameter such as its strength is set in the encoder. Unlike the rate control, the QP control here is to ensure that the strength of the de-blocking in the encoder is at least similar, if not stronger than the strength of the de-blocking in the decoder.

Figure 10:
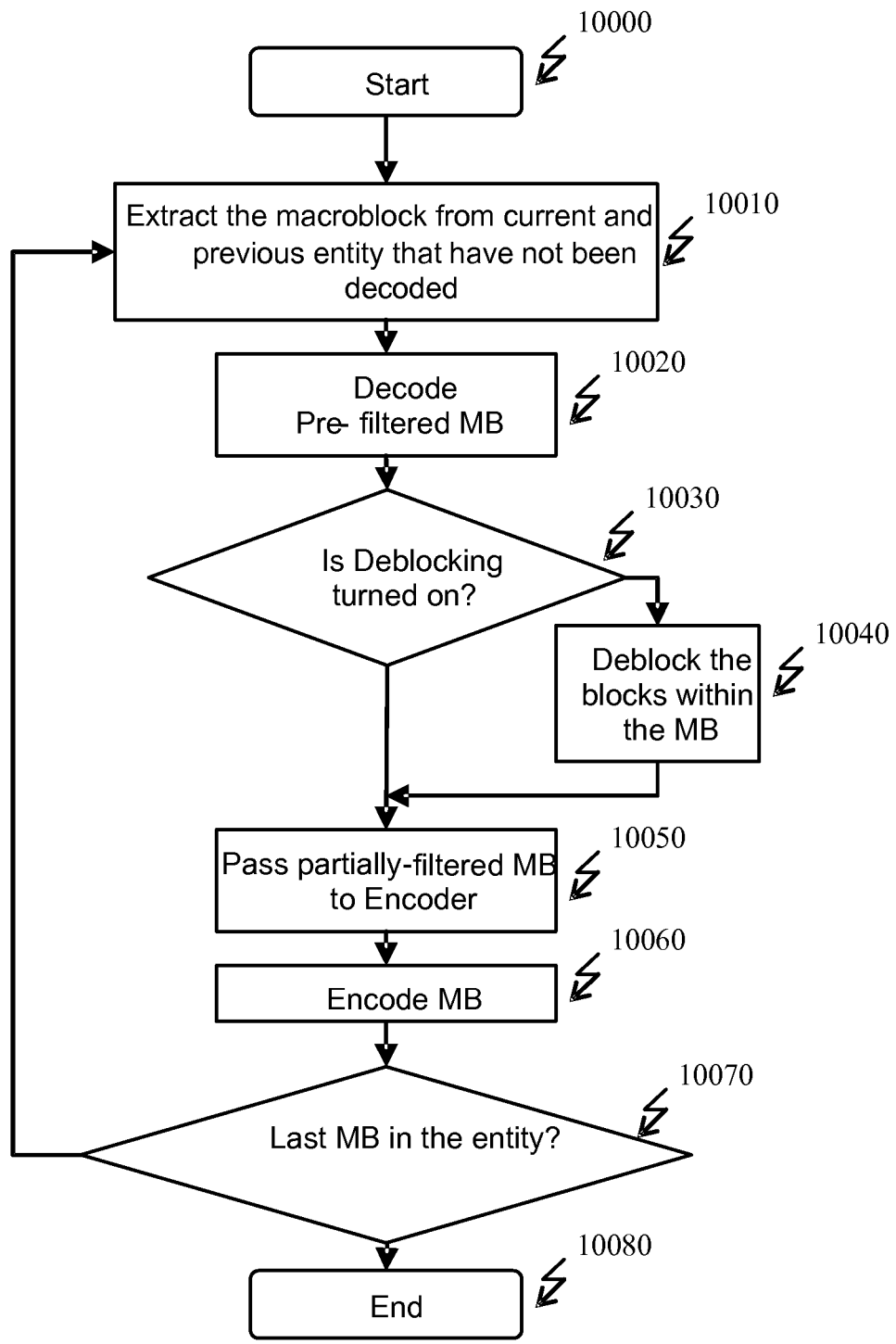
FIG. 10 illustrates an embodiment of a second approach for decoding and re-encoding macroblocks for Reduced-Algorithmic-Delay Video Rate Conversion Operation.
Figure 13:
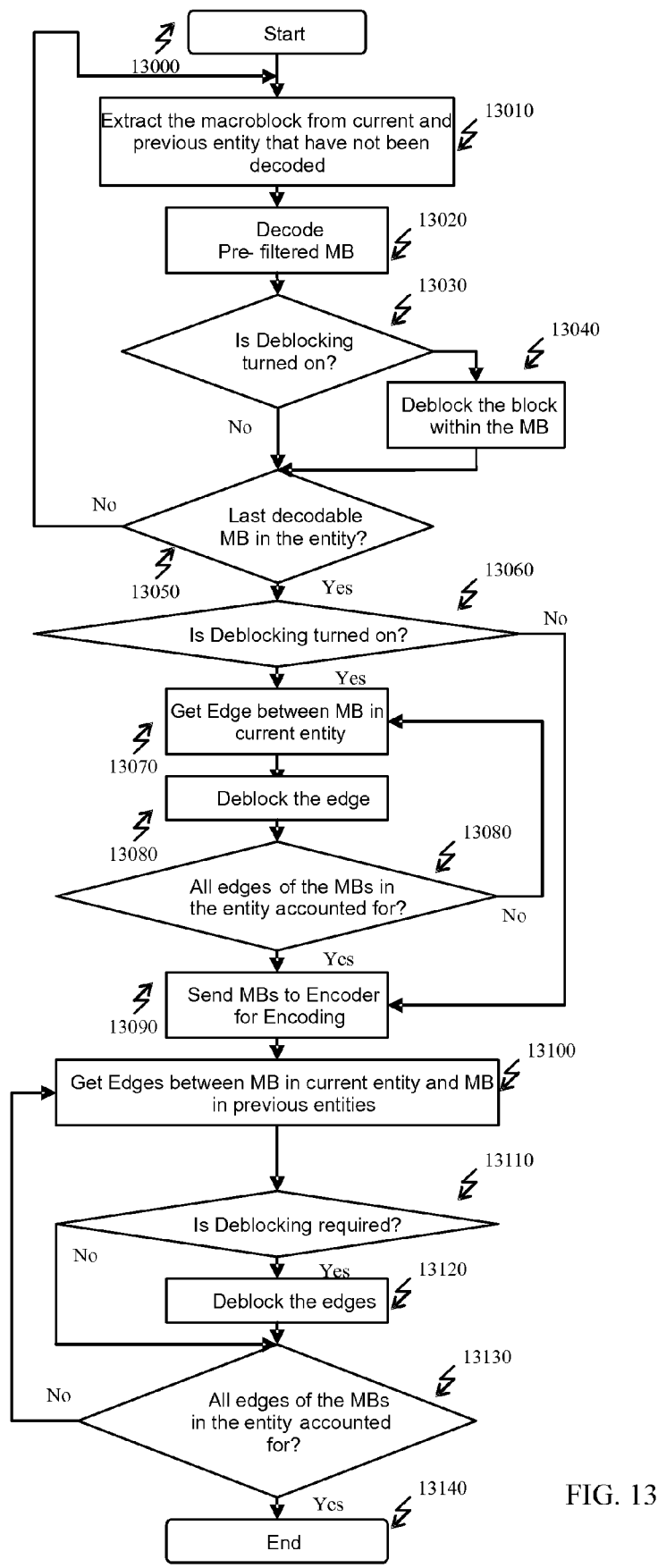
FIG. 13 illustrates an embodiment of a third approach for decoding and re-encoding macroblocks for Reduced-Algorithmic-Delay Video Rate Conversion Operation.
Figure 21:
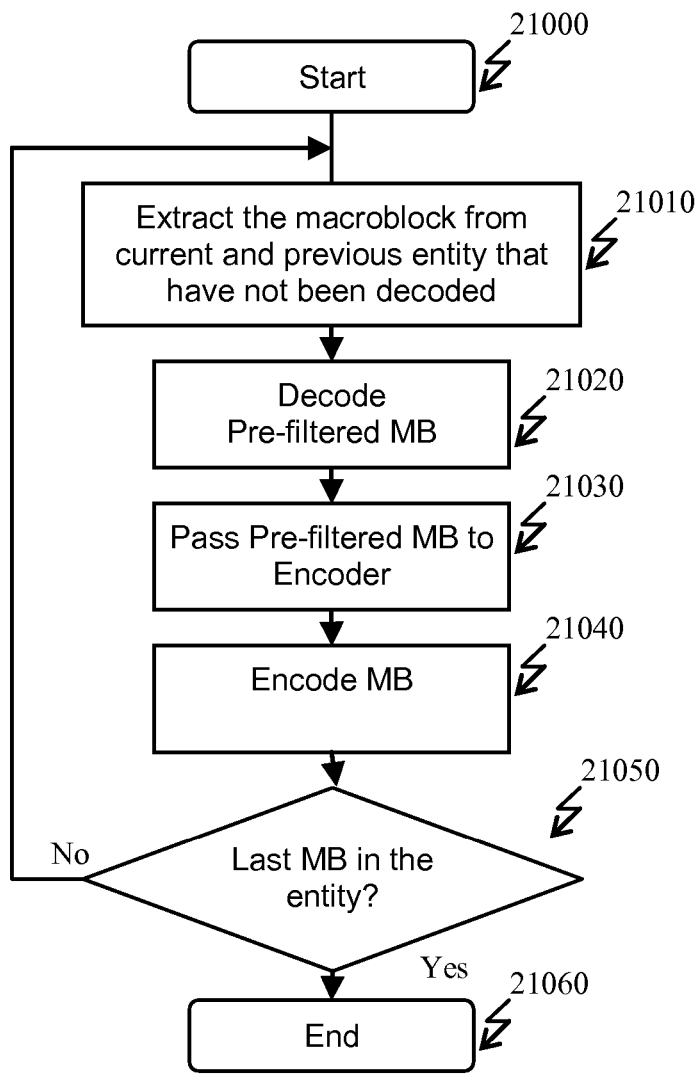
FIG. 21 illustrates an embodiment of a first approach for decoding and re-encoding macroblocks for Reduced-Algorithmic-Delay Video Rate Conversion Operation.

This minimal QP can be overridden by the rate control mechanism. If the entity is found to contain slice content, the macro-blocks in the entity are decoded partially without having to perform all of the de-blocking operation, and re-encoded in step 20200. There are at least three approaches to the implementation of the macro-block decoding and transfer to the encoder, depending on the performance desired. They are explained with reference to FIG. 21, FIG. 10, and FIG. 13, respectively.

The first approach is aimed to reduce the computation that is used for the macro-block to be passed to the encoder for encoding. In this approach, no filtering is performed on the macro-block after the spatial values has been decoded partially. An embodiment of the first approach employing the process is explained with reference to FIG. 21. The bit-stream of the macro-block is decoded in step 21010. It is possible that the end of the last entity contains partial information of a macro-block which cannot be fully decoded in the received last data packet, for example, when the entity is a fragmentation unit and the content is not aligned at the macro-block boundary. In this case, non-decoded bit-stream from previous entity is combined with the bit-stream of current entity before the macro-block is being partially decoded in step 21020. After decoding, the pre-filtered macro-block is then passed to the encoder in step 21030 to be encoded in step 21040. In the first approach, all the de-blocking of the blocks in the entity is to be performed after all macro-blocks in the entity are encoded. This thus reduces transmission time of the bitrate from the input buffer to the output buffer.

Figure 2:
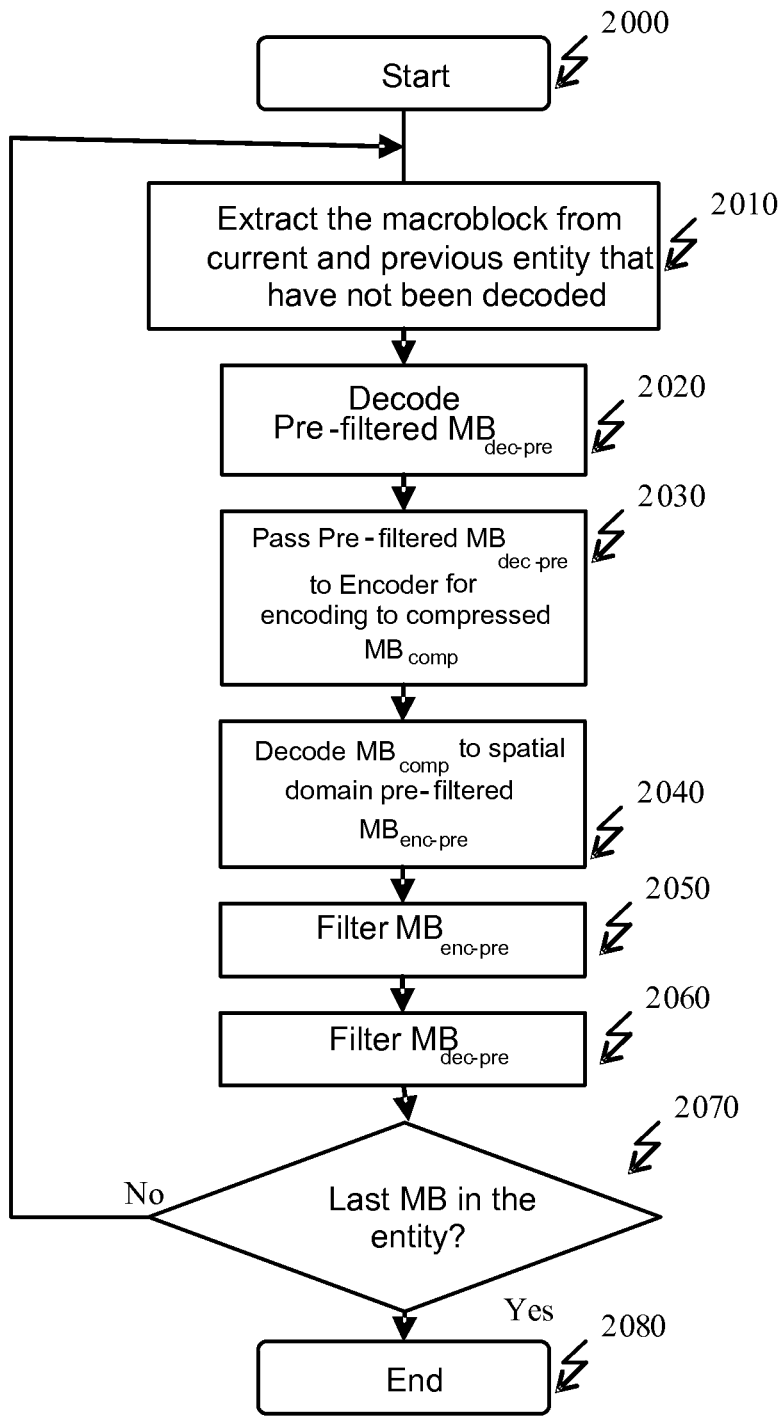
FIG. 2 illustrates a Reduced-Algorithmic-Delay Rate Converter that performs filtering for the decoder right after a filtering process for the encoder according to an embodiment of the present invention.

In an embodiment, the filtering for the decoding and encoding are performed consecutively. One of the benefits of grouping the filtering process for both decoder and encoder together is to mitigate the compulsory instruction cache miss caused by the instruction cache capacity. The reason is when the filtering process of the encoder is finished; the filtering module is still residing in the instruction cache. This embodiment is explained with reference to FIG. 2. The bit-stream of the macro-block is decoded in step 2010. The macro-block is then partially decoded to MBdec-pre in step 2020, with no filtering performed. After decoding, the pre-filtered macro-block MBdec-pre is then passed to the encoder in step 2030, which encode the macro-block to compressed macro-block MBcomp. The compressed macro-block is the information in the macro-block stored in memory used to reconstruct the macro-block in the reference frame for the encoding of the future frame. This is usually the macro-block information after transformation and quantization, and before entropy encoding. The compressed macro-block will be encoded into a bit-stream either immediately or later in the encoding process. In step 2040, the compressed macro-block MBcomp is decoded to spatial domain pre-filtered macro-block MBenc-pre, and filtered in step 2050. The filtered block is later used to reconstruct the macro-block in the reference frame of the encoder. Step 2050 is immediately followed by step 2060, which uses the same procedure or logic as step 2050 to filter the pre-filtered macro-block MBdec-pre from the decoder. The reuse of the same instruction ensures that filtering instruction in the instruction cache can be reused for this purpose. The filtering might only be performed for part of the macro-block. The process then checks if it is the last macro-block in the entity in 2070, and if so, the control is given to 2010. Otherwise, the process ends in 2080.

The second approach provides limited filtering within the partially decoded macro-block before it is encoded. It is aimed at getting a balance between getting a more accurate filtered block for re-encoding and reducing computational time before the decoded macro-block is re-encoded. It has an advantage of minimizing the memory access used by performing some de-blocking within the macro-block, since the macro-block has just been decoded and available in the internal memory of a DSP. An embodiment of the second approach employed the process explained with reference to FIG. 10. In this process, step 10040 de-blocks the edges of the blocks within the macro-block, and the partially filtered macro-blocks are passed to the encoder in step 10050 to be encoded in step 10060. In the second approach, the de-blocking of the edges between macro-blocks is performed only after all the macro-blocks in the entity are sent to the encoder for encoding. In another approach of the partial de-blocking, only the macro-block edges at the top and left of the macro-block are de-blocked, given that the macro-block is received in scan-line order. The macro-block edges at the left and bottom of the macro-block is left untouched.

In an embodiment, de-blocking is employed as much as possible without affecting the algorithmic delay of the Rate Converter. This approach employs a "best effort" de-blocking strategy for all the macro-blocks in current entity which is in the bit-stream. An embodiment of the second approach employed the process explained with reference to FIG. 13. The process is separated into four parts. In the first part, the macro-block is being extracted in step 13010 and partially decoded in step 13020. If the de-blocking is turned on, the edges between the blocks within a macro-block is de-blocked in step 13040 once the macro-block is partially decoded. In the second part, the edges between the macro-blocks within the current entity are de-blocked in step 13080, when the de-blocking is turned on. In the third part, all the partially decoded macro-block is then sent to the encoder for encoding in step 13090. In the fourth part, the edges between the macro-block in the current entity and previous entities are de-blocked in step 13120, before the macro-blocks are stored in the reference frame memory.

An advantage of dividing the operation into different parts is that this improves the cache hit rate when the process is executed in a DSP. In addition, since the macro-block from the previous entities is used after the macro-block is being encoded, a DMA transfer can be made at the beginning of the first part for them to be loaded from external into internal memory, if they are not already in the internal memory.

Smart Pass-Through is used in an embodiment when the incoming media bitstream has the same or similar media coding standard and restriction (also known as profile and level in video coding standard). If this is not the case, generated media transcoding techniques may be used to transcode from one media format to the other.

The hybrid trans-rater operates on the incoming data packets to produce outgoing data packets by switching between two operations: the simple pass-through and rate converter. An advantage of using such operation is that the simple pass-through allows reduced algorithmic delay and uses less computation than the normal rate conversion technique. Thus, the hybrid trans-rater employs simple pass-through when the circumstances allow.

The simple pass-through involves operations that do not change the content of the media bit-stream. In other words, the raw media fully decoded from the incoming bit-stream should be exactly the same as the raw media fully decoded from the outgoing bit-stream. simple Pass-Through usually either does not require to decode the content of the bit-stream, or involves limited decoding of bit-stream, such as extracting the header information, for example, to know the frame type or macro-block type (such as Intra or Inter frame) and the boundary of the entities (for example, macro-block) within the media bit-stream.

The rate converter is used when the outgoing network bandwidth is different from the incoming network bandwidth, and the change in bandwidth may occur dynamically. It provides the capability to change the bitrate of the media bit-stream such that it can fit into the outgoing network with the integrity of the media still intact, and only the quality differs. This rate converter is different from packet dropping, in which the integrity of the media can drop dramatically. This operation for changing the bitrate is also known as trans-rating.

The decision as to which of the two operations to be used can also change dynamically in real time during the transmission of the data packets. This technique is usually used when the coding standard and restriction of the incoming bit-stream and outgoing bit-stream are the same, and bandwidth of the network might vary dynamically.

The decision as to which of the two operations is to be used can be determined before the media is converted, for example, during session setup in the media gateway when two data terminals, connected to the media gateway negotiate to exchange the media. This is possible if the system determines that the media coding standard and restriction used for the incoming media and outgoing media are the same, and the outgoing network bandwidth is larger than the incoming network bandwidth. Also, such decisions can be pre-determined, and the system executes only one operation, if it is known that the conditions are always true for the trans-coding.

Figure 14:
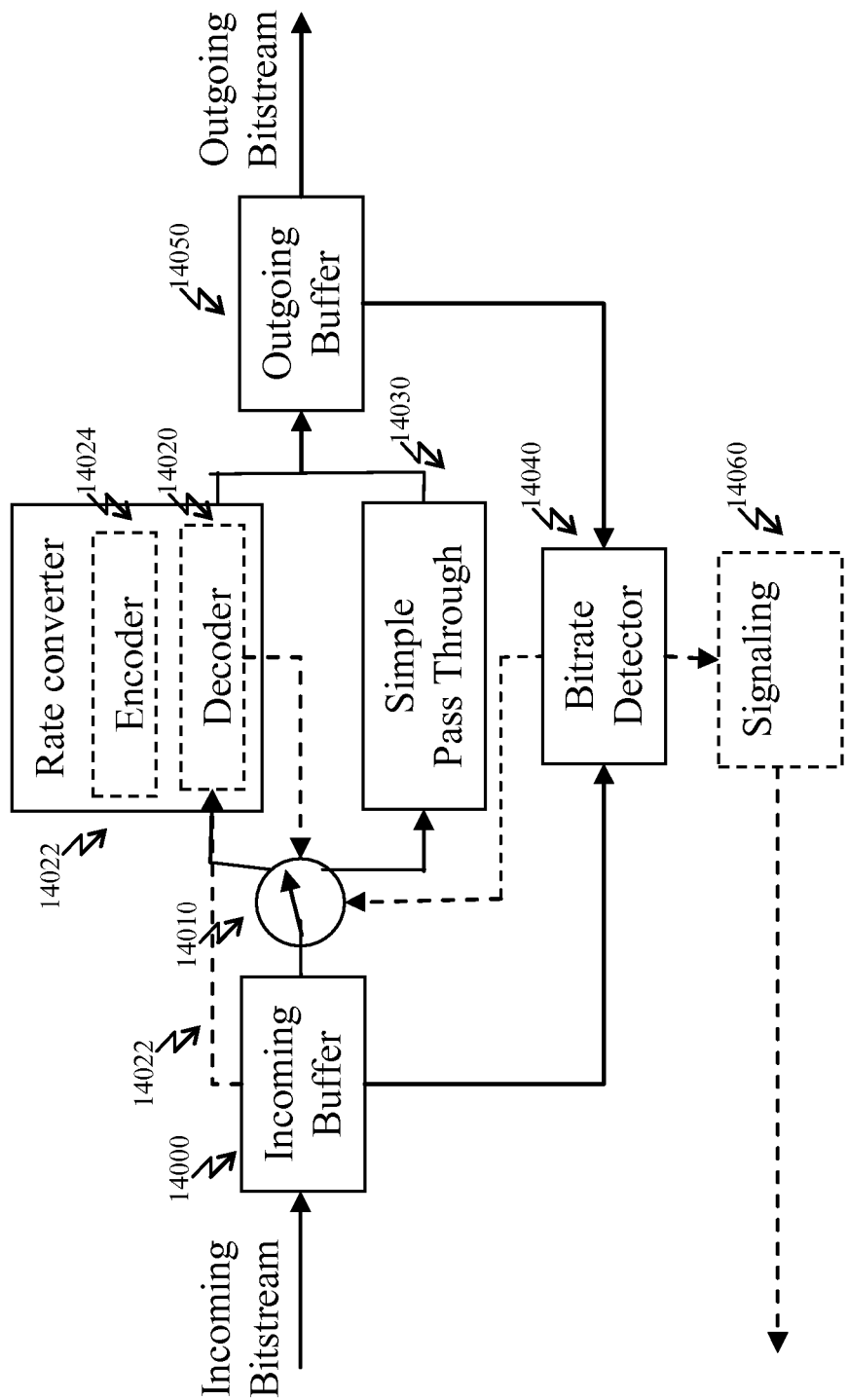
FIG. 14 illustrates an embodiment for the apparatus for Smart Pass-Through Operation.

An embodiment of the apparatus for hybrid trans-rating when the switching operation changes dynamically in real-time is illustrated with reference to FIG. 14. Modules containing in the apparatus includes:

An incoming buffer 14000 which receives the data packets from the incoming network transmitted from a source data terminal.

An outgoing buffer 14050 which sends out the data packet to the outgoing network transmitted to the destination data terminal.

A bitrate detector 14040 for detecting the fullness of the buffer, so as to estimate the dynamic bandwidth of the outgoing network. Information from the incoming buffer is also fed to a bitrate detector.

A signaling module 14060, which is optional. It feedbacks the information on the outgoing network bandwidth to the source data terminal that sends the incoming buffer so as to reduce the incoming media bitrate.

A switch 14010 which changes the data path of the packets between simple pass-through and rate converter modules, depending on the conditions and approach that is used for the switching. Dynamic switching of the data path between Pass-Through and Rate Converter operation is allowed if certain situation occurs and certain conditions are satisfied. The Switch includes a decision module for switching, which in one approach, performs low level partial decoding of the incoming bit-stream to identify some prerecorded information within the bit-stream, for example, the frame type and macro-block type. In another approach, it also obtains information from the decoder in the Rate Converter to determine if switching is possible. This is shown as a dotted data path from Decoder 14020 to Switch 14010 with reference to FIG. 14.

A simple pass-through Module 14030 which decodes the packet and repackages the media stream unit from the Incoming Buffer to the Outgoing Buffer. The module is considered to be light weight in that it does not decode the incoming media bit-stream.

A rate converter module 14020 which decodes the bit-stream of the media from the incoming buffer. The rate converter includes a decoder 14024 and encoder 14020 that performs at least a partial re-encoding of the media bit-stream, if not the full re-encoding of the media bit-stream. In one embodiment, the decoder is a fully operational decoder and it extracts the bit-stream directly from the incoming buffer and performs a full decoding even if the data path is switched to the Pass-Through Module 14030 by the switch 14010.

In one embodiment of the apparatus for hybrid trans-rating, the apparatus for the simple pass through module is the reduced algorithmic delay media stream unit conversion, and the rate converter module includes a module for decoding the full or partial media stream unit from the data packet, and re-encoding to a new media stream unit and repackage it into the data packet. The apparatus for decoding and re-encoding the bit-stream in partial media stream unit is the apparatus for Reduced-Algorithmic-Delay Rate Conversion.

In another embodiment of the apparatus for hybrid trans-rating when the switching operation changes dynamically in real-time is the apparatus for reduced algorithmic delay media stream unit conversion, in which the outgoing packet construction module involves switching between a simple bit-stream copying to reconstruct the media stream unit, and a rate converter to decode and re-encode the incoming bit-stream in the partial media stream unit.

Figure 15:
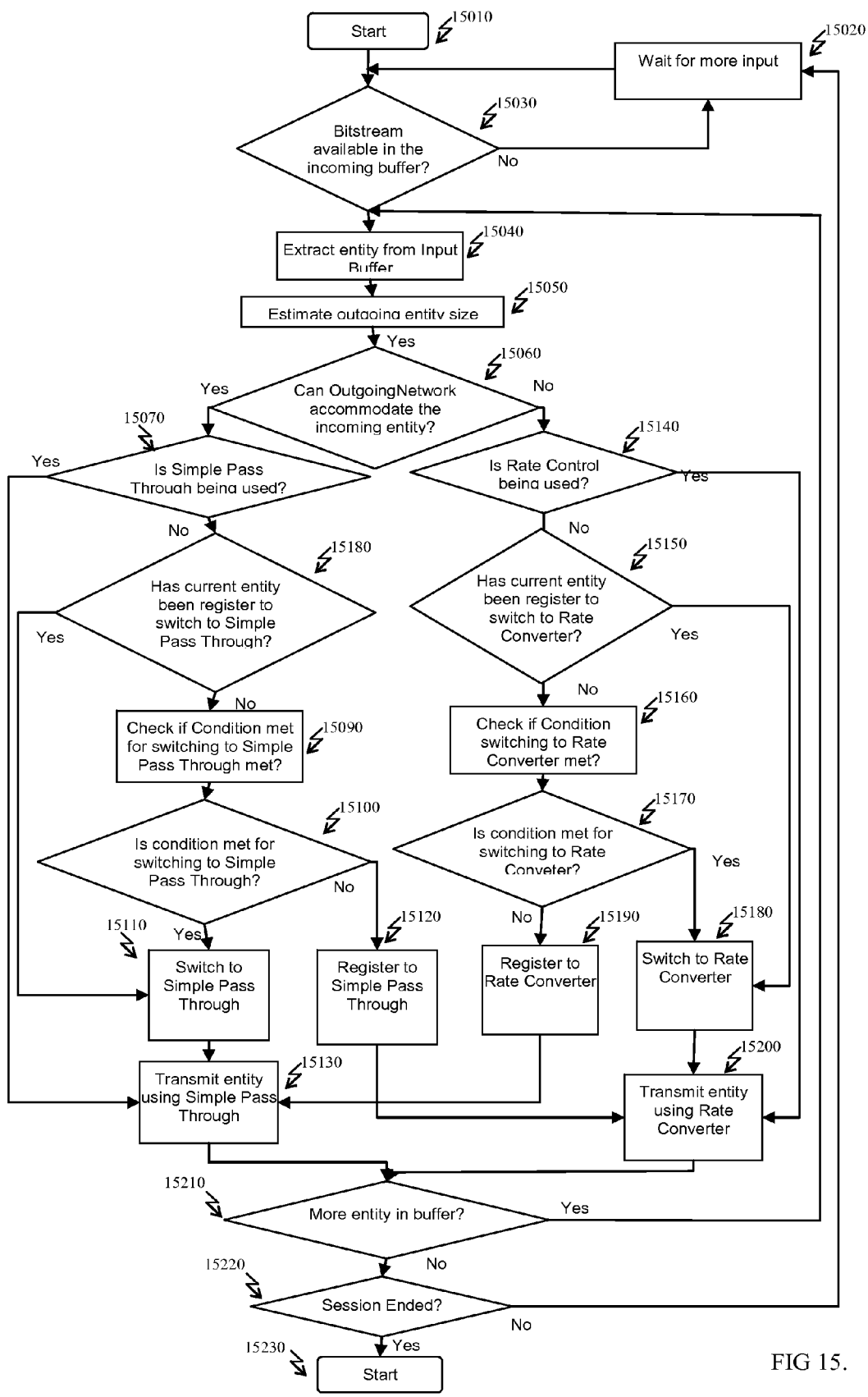
FIG. 15 illustrates an embodiment for the method for Smart Pass-Through Operation.

A detailed embodiment of the process of dynamic switching between pass through and rate control in hybrid trans-rating is shown in FIG. 15. Dynamic switching of the data path between Pass-Through and Rate Converter operation is allowed if certain situations occurs and certain conditions are satisfied. The decision module 15060 determines if the situation is suitable, and the modules 15090 and 15160 determine if the conditions are satisfied.

There are at least two types of switching: frame-by-frame switching and macro-block-by-macro-block switching. Depending on the type of switching, this determines if the entity extracted from the bit-stream in step 15040 is a frame or a macro-block respectively. In the frame-by-frame basis switching, the switching operation is only allowed at the start of the frame. If the bit-stream that is being currently analyzed does not contain the start of the frame, the switching operation is delayed until the start of the frame is encountered in the future bit-stream. Such frame-by-frame operation has simpler condition checking criteria for switching. This means that switching is not instantaneous, and might not occur when the current media bit-stream is being processed. In addition, such decision may be reversed if the condition changes in the upcoming bit-stream before the start of a new frame changes. For example, a decision might be made to change the data path from rate converter to pass-through, and after the decision is made, the bandwidth of the outgoing network changes, and the decision is forced to revert back to rate converter even before such switching occurs. The approach that is taken to implement the operation on whether a full decoder is used has an effect of which switching operation is allowed.

A situation that triggers the switching operation from pass-through to rate converter is that the bandwidth of the outgoing network cannot accommodate the bitrate of the incoming bit-stream. This happens when the bandwidth of the outgoing network decreases, or the bitrate of the incoming media bit-stream increases, or under circumstances where the bitrate is increased, or the combination of any of the three situations. The bitrate of the media bit-stream increases when more information is inserted into the bit-stream or when that part of the bit-stream is re-encoded in a different format. One example whereby the bit-stream is re-encoded is where the system re-encodes a P (predictive) frame to an I (intra) frame. This can happen when the system receives a Video Fast Update (VFU) request generated by the data terminal in the outgoing network which detects an error in the media bit-stream. As an I frame is larger than a P frame, the bitrate can increase dramatically even though the decoded frame quality is similar.

A situation that triggers the operation from rate converter to pass-through is that the bandwidth of the outgoing network can accommodate the bitrate of the incoming bit-stream. In addition, there is no additional requirement that the format of the outgoing media bit-stream has to be changed, or even if there is such a request, the outgoing bandwidth is still large enough to accommodate the changes.

The conditions that allow the switching operation depends on the approach that is taken to implement the operation. There are at least three approaches to enable the switching operation.

In a first embodiment, the condition for switching between simple pass-through and rate converter is satisfied if any of the three possibilities occurs. Switching is only allowed on both the frame-by-frame basis and the macro-block-by-macro-block basis.

The first possibility is that the incoming frame is an intra frame, the second possibility is that the frame contains only intra macro-blocks. One embodiment of the process of checking the condition in Step 15090 and 15160 of FIG. 15 is explained with reference to FIG. 16, which use the combination of the first two possibilities. The switching condition is met when the system realized that the incoming frame type, indicated by the frame header information, is an I frame in decision 16020. In this case, the following bit-stream following the header can be switched either from simple pass-through to rate converter or vice versa. If this is not met, decision 16030 determines if all the macro-blocks in the current frame are all intra macro-blocks. This is used if the current frame is a P frame. In this case, the switching is only possible if the last macro-block of current frame is in the bit-stream. If it is found that the bit-stream does not contain the last macro-block, it is necessary to cache up the macro-block type of the macro-block in the frame, and decision is made only when the last macro-block type is known. Switching can be executed on all the macro-blocks in the frame if it is determined that all the macro-blocks in the frame are intra macro-blocks.

The third possibility is that any condition that is to ensure the frame has been "refreshed" entirely. An example in which the last possibility occurs is when the Intra macro-block is distributed across a sequence of consecutive frames, such that the macro-blocks in the last frame of the consecutive frame sequence that does not depend of any of the blocks before the consecutive frame sequence. This can happen, for example, when spatial intersection of the intra macro-blocks across the consecutive frame sequence covers the entire frame, and that once an intra macro-block appear in any of the consecutive frame, the macro-block in the same position in the subsequence frame is skip blocks.

In this case, the system decides whether switching between simple pass-through and rate converter is probable each time when any of the three conditions is satisfied.

In a second embodiment, the incoming bit-stream is always fully decoded. Such decoding is performed on the decoder in the rate conversion. This is performed because, in rate conversion, the re-encoding of the media bit-stream using a predictive (P) frame of different quality generally requires the decoded frame from the decoded bit-stream. The decoder 14020 and its associated data path 14022 is illustrated with respect to FIG. 14.

In the second approach, dynamic switching from simple pass-through to rate converter does not depend on the characteristic of the incoming bit-stream, and can be performed anytime on a frame-by-frame or macro-block-by-macro-block basis. Thus, the condition in decision 15170 of FIG. 15 is always met in this approach and switching to rate converter in step 15110 is always possible. In addition, operation in step 15160 is not performed. In this approach, the entity to be analyzed can either be a macro-block or a frame, and the switching process can be done in macro-block-by-macro-block or frame-by-frame basis, respectively.

In the second approach, dynamic switching from Rate Converter to Simple Pass-Through without error only occurs under certain condition. There are three embodiments to output the such bit-stream.

One embodiment is to allow switching only when the decoded output bit-stream from the Simple Pass-Through matches the decoded output bit-stream exactly. Theoretically, from the perspective of video coding, Simple Pass-Through can be used without any drift error if the raw media fully decoded from the media bit-stream from the incoming network is exactly the same raw media fully decoded from the outgoing bit-stream. This happens if incoming frame is an I frame or frame contains entirely of Intra blocks, or that if the incoming frame is a P frame, the reference frame used for decoding the P frame, or hypothetical reference frame used if the P frame is decoded, is exactly same as the reference frame used for encoding the outgoing frame, or hypothetical reference frame used if encoding is performed. The process switching is illustrated with respect to FIG. 17, and this is generally done on frame-by-frame basis. The same reference frames from the encoder and decoder are extracted in step 17040 and step 17050. Their differences are then calculated between the two reference frames of the same location in step 17070. In one embodiment, the difference function is the sum of absolute difference between the spatial values of the reference frames. If this difference is found to be smaller than a threshold in decision 17070, the reference frames are considered to be similar, and the condition for switching is met. Otherwise, the condition is not met.

Figure 11:
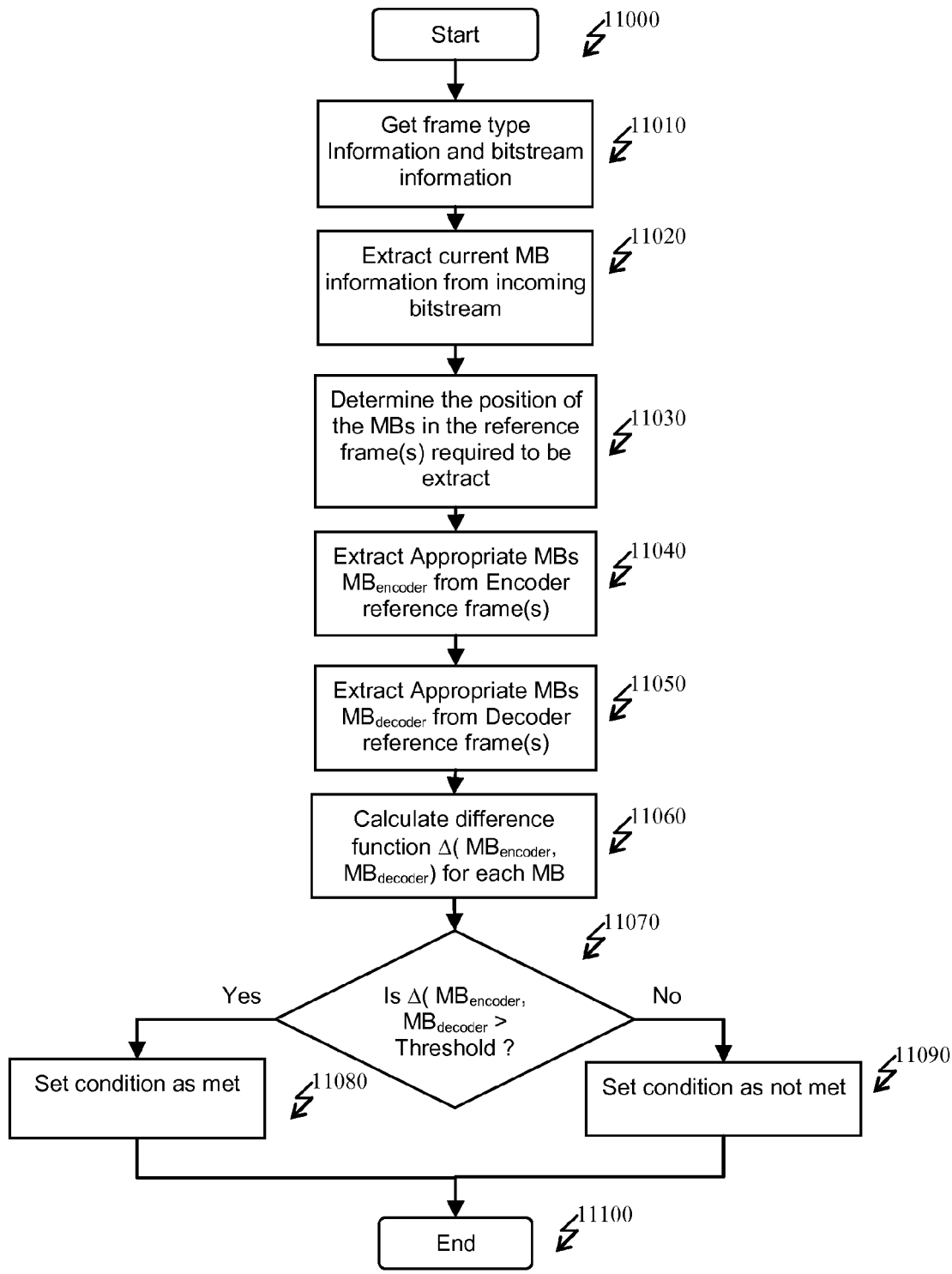
FIG. 11 illustrates another embodiment for the second possibility in determining the condition for switching from Rate Converter to Simple Pass-Through, and vice versa for Smart Pass-Through Operation.

It is possible in this embodiment to perform the switching in macro-block-by-macro-block basis. This process is illustrated with respect to FIG. 11.

Another embodiment is for the rate converter to generate an outgoing P frame that has a quality which is the same as or higher than the current incoming P frame, before the operation is switched to simple pass-through for handling the next incoming P frame. This operation allows the bitrate of the outgoing bit-stream to be similar to that of the incoming bit-stream. This is explained with reference to FIG. 18, where by the quality of the previous frames in the encoder is extracted in step 18020 and the quality of the previous frames of the same location in the decoder is extracted in step 18030. The two qualities are then compared and when all of the quality differences between respective frames are less than a threshold, the condition for switching is satisfied.

It is possible for the Rate Converter to generate an outgoing I frame with the quality that is same as or higher than the current incoming P frame, before the operation is switched to Simple Pass-Through for handling the next incoming P frame. However, this may lead to a sudden increase in bitrate as outgoing I frame of the same quality is generated from incoming P frame. In addition, the quality in I frame is different from the quality in P frame even the same quality control parameter, known as quantization parameter, is used.

Another embodiment is for the rate converter to compare the reference frame stored in its decoder to the reference frame stored in its encoder when full decoding and full encoding are performed. P frame is output if the two reference frames are confirmed to be similar, otherwise, either an I frame is output, or that I macro-blocks are output in the spatial region in the macro-block location where the differences between the reference frame stored in its decoder to the reference frame stored in its encoder are above a defined threshold.

Figure 16:
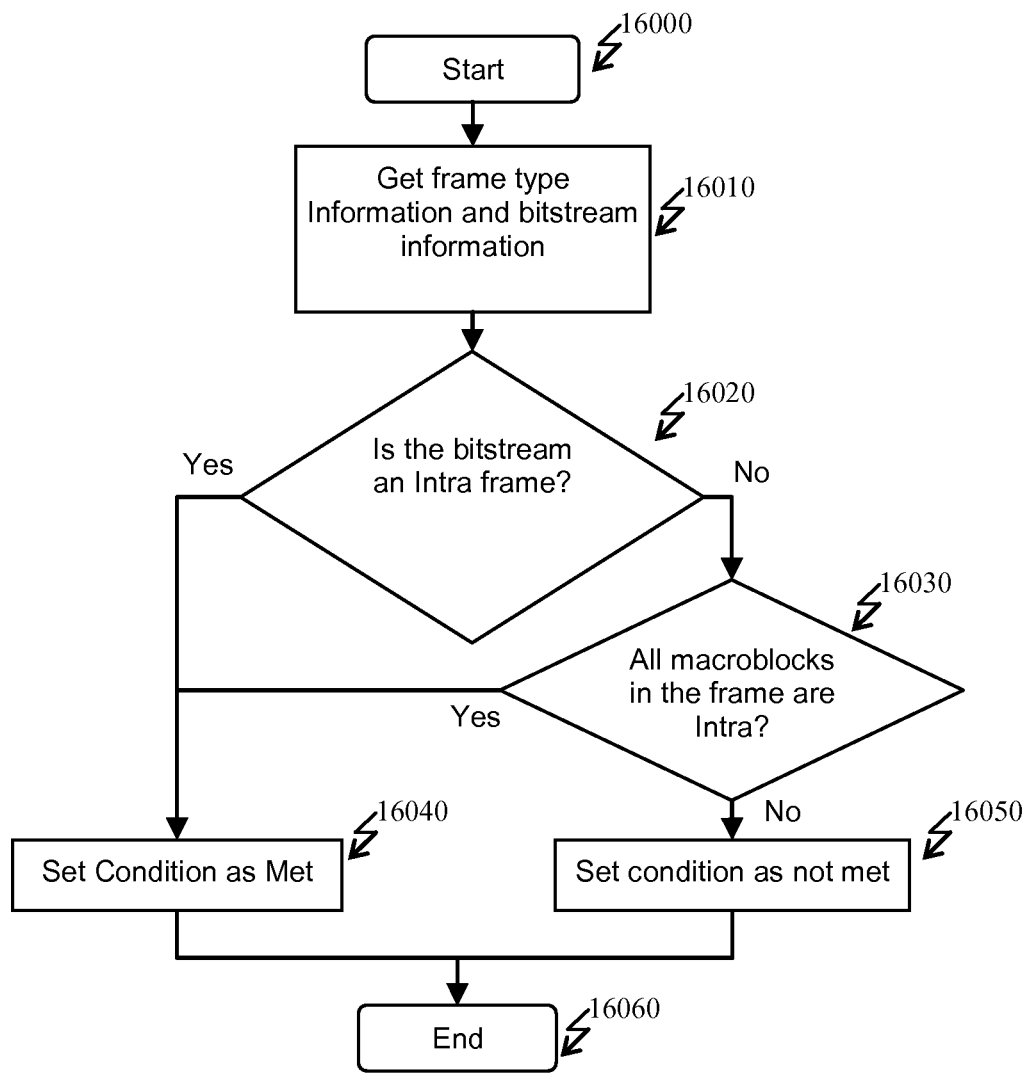
FIG. 16 illustrates an embodiment for a first possibility in determining the condition for switching from Simple Pass-Through to Rate Converter, and vice versa for Smart Pass-Through Operation.
Figure 17:
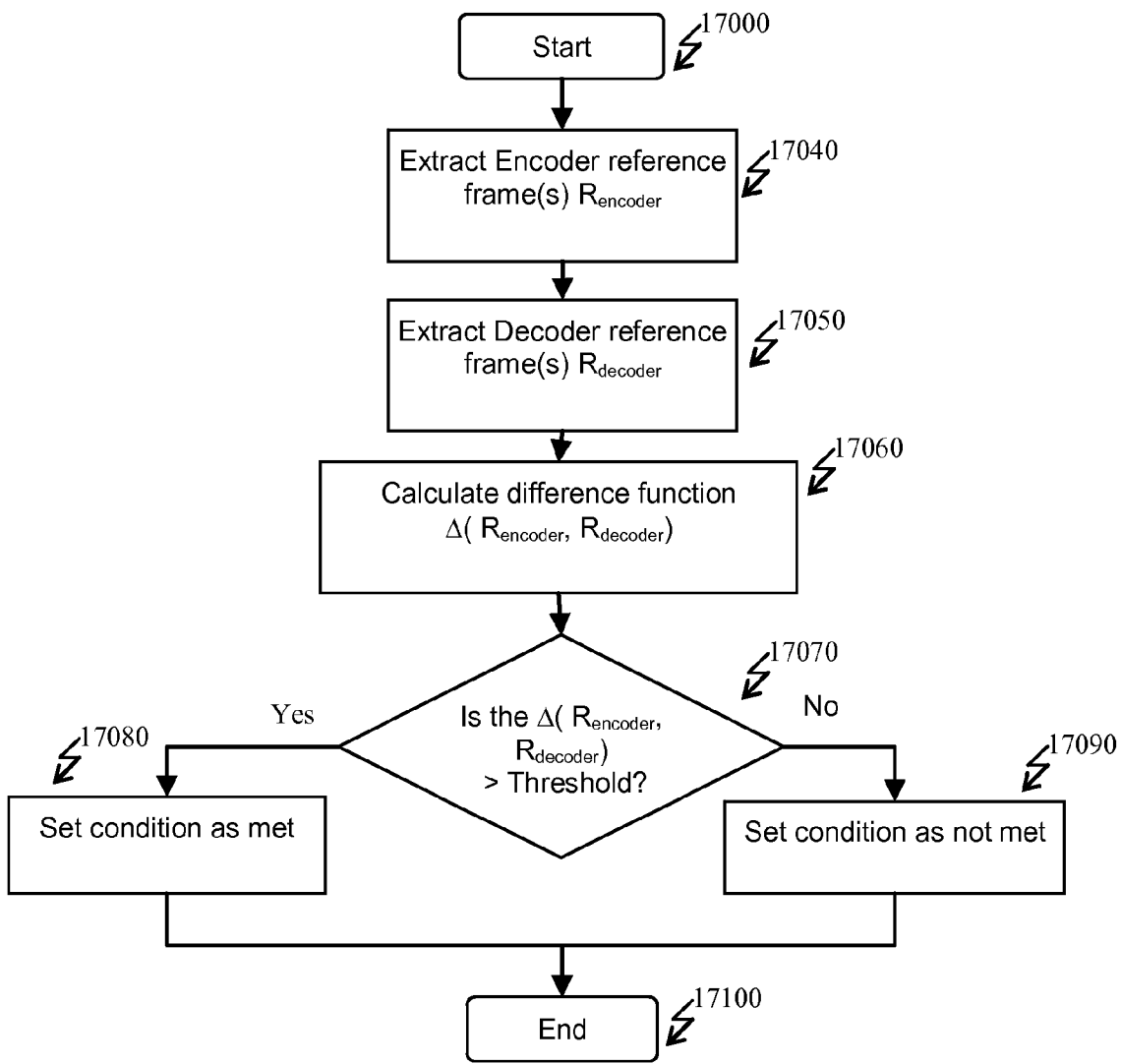
FIG. 17 illustrates an embodiment for a second possibility in determining the condition for switching from Rate Converter to Simple Pass-Through, and vice versa for Smart Pass-Through Operation.
Figure 18:
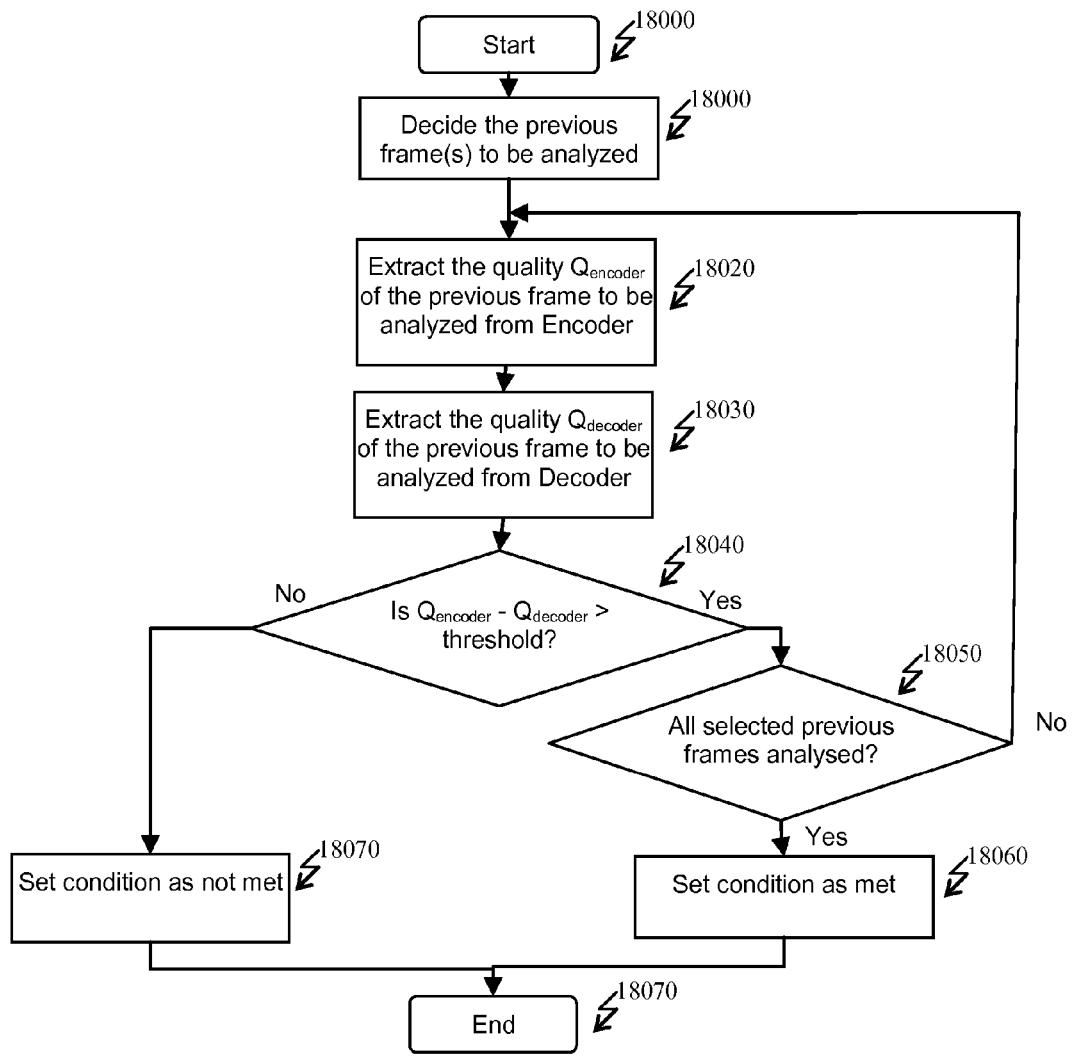
FIG. 18 illustrates an embodiment for a third possibility in determining the condition for switching from Rate Converter to Simple Pass-Through, and vice versa for Smart Pass-Through Operation.

In one embodiment a combination of operations is used as described in reference to FIG. 16 for handling incoming I frame or P frame containing all I macroblock, and operation described in FIG. 17 or FIG. 18 or other embodiment described for handling other incoming P macroblock. In this embodiment, the operation described with reference to FIG. 15 is executed first. If the condition is not met, either operation described in FIG. 17 or FIG. 18 or other embodiment described for handling other incoming P macroblock is executed.

In another embodiment of the method for Smart Pass-Through, the method for Simple Pass Through Module is the Reduced-Algorithmic-Delay Media Stream Unit Conversion, and the method for Rate Converter includes a method for decoding the full or partial media stream unit from the data packet, and re-encoding to a new media stream unit and repackage it into the data packet. The method for decoding and re-encoding the bitstream in partial media stream unit is the method for Reduced-Algorithmic-Delay Rate Conversion.

In yet another embodiment, the method for Smart Pass-Through is the method for Reduced-Algorithmic-Delay Media Stream Unit Conversion, in which the method for constructing outgoing data packet involves switching between a simple bitstream copying to reconstruct the media stream unit, and the method of Rate Converter to decode and re-encode the incoming bitstream in the partial media stream unit. The method for decoding and re-encoding the bitstream in partial media stream unit is the method for Reduced-Algorithmic-Delay Rate Conversion.

The Smart Pass-Through and Simple Pass-Through system is employed on a media gateway to pass the media bitstream between different networks, in particularly, between the IP packet switch network and 324M circuit switch network. In this configuration, the data terminal at one side of the network negotiates with the data terminal at the other side of the network through the media gateway. Connection is then setup between the data terminals and the media gateway. After the session setup, the Pass-Through operation is activated to receive incoming media bitstream from the data terminal in the packet switch network, to convert media bitstream and to transmit the converted media bitstream to the data terminal in the circuit switch network, and vice versa. The Pass-Through operation can either invoke Smart Pass-Through which involves both Rate Converter and Simple Pass-Through, or only invoke Simple Pass-Through which can work independently. In addition, the rule for packaging the media stream unit is stricter in the packet switch network than in the circuit switch network.

When the media bit-stream is converted from the IP packet switched network to the circuit switch network through the media gateway, Rate Converter is usually employed at the media gateway for proper transmission, since the bandwidth at the packet switch side is usually larger than the bandwidth at the circuit switch side. The process involves extracting the media stream units from the incoming data packet. In the case where fragmentation unit, aggregation unit, or aggregation-fragmentation unit contains header, the information is analyzed, and the packet placed in correct order and its content extracted with the respective headers removed before further operation. If rate conversion or format conversion (such as changing the frame type) is necessary, the media bit-stream within the media stream unit is decoded, and re-encode to a produce new media bit-stream and repackage into media stream unit. Delimiter is then inserted in between the media stream units and these are repackaged as circuit side data packets and sent out. If only Simple Pass-Through is used, similar operation is performed except that decoding and re-encoding of the media bit-stream within the media stream units is not necessary.

A detail explanation of the above operation with reference to transmission of H.264 media bit-stream from the IP network over RTP to the 3GPP 324M circuit switch network is given here. Here, the H.264 is transmitted within the RTP payload as specified by RFC 3984, and the H.264 NALU packet is encapsulated within the RTP packet either as a single unit, aggregation unit or fragmentation unit.

For the circuit side, the H.264 bit-stream is encapsulated in SDUs, with each media stream unit separates by a start code as specified by the H.264 Annex B standard. It is necessary for the NALU to be arranged in right consecutive order before sending out. Thus, reordering of the RTP packets is necessary if they came in a different order. After the reordering, the payload of the RTP is then analyzed to determine whether the H.264 RTP format is a single unit (SU), fragmentation unit (FU) or aggregation unit (AU) according to the packet header information.

If FU is identified, its header is first read to determine FU type, and whether it is the first FU. If it is determined to be the first FU, start code is added. The bit-stream that followed the FU is either copied directly to the SDU payload if Simple Pass-Through is used, or decoded and re-encoded if Rate Converter is used.

If SU is identified, the start code is added to the beginning before the bits are packet in SDU, and the respective NALU is extracted and either copied over if Simple Pass-Through is used, or decode and re-encode if Rate Converter is used.

If AU is identified, the aggregation header is first read. Following that, the length of the next NALU is extracted, the start code is added to the outgoing SDU, and the respective NALU is extracted, it is either copied over if Simple Pass-Through is used, or decoded and re-encoded if Rate Converter is used. Following, the next NALU length in the AU packet is read and the process transmission of NALU from the AU packet to the SDU continue until the last NALU is handled in the AU.

In some cases, the sizes of the incoming packets exceed the maximum size allowed by the SDU. In this case, it is generally necessary to fragment the extracted bit-stream and repackage it over a few SDU before sending them out.

When the media bit-stream is converted from the circuit switch network to the IP packet switched network through the media gateway, a stand alone Simple Pass-Through without Hybrid Transrating is usually possible, since the bandwidth in the IP side can be larger than the circuit side. The Simple Pass-Through technique is covered in the invention, and detail explanation of an embodiment of the process is explained with reference to FIG. 5, and the examples of the outgoing data packet format are explained with reference to FIG. 1. In the case when a Hybrid Transrating is employed, the same Simple Pass-Through operation can be incorporated within the Hybrid Trans-rater. The Rate Converter technique in the Hybrid Transrating involves fully decoding and re-encoding of the incoming media stream unit to accommodate it to the outgoing bandwidth available, before the encoded media stream unit is packed into the data packet, such as single unit, fragmentation unit, aggregation unit or aggregation-fragmentation unit.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for performing compressed video bitstream conversion with reduced algorithmic delay, the apparatus comprising:
    a pass-through module configured to:
        extract from incoming data packets corresponding to an incoming bitstream of video data, a series of discrete media stream units, wherein each said media stream unit comprises an encoded representation of video data; and
        re-packetize the extracted media stream units into outbound data packets for outward transmission,
        wherein segmentation of one or more of the extracted media stream units within the outbound data packets is different from segmentation of the same one or more media stream units within the incoming data packets,
        and wherein segmentation of the extracted media stream units within the outbound data packets is determined based on at least one data packaging rule applicable to a network transport layer carrying the outbound data packets;
    a trans-coding module configured to vary a format used to represent the incoming bitstream of video data; and
    a switch module coupled to the pass-through module and the trans-coding module,
    wherein the switch module is configured to respond to a determination that available bandwidth of the outgoing network connection is insufficient to accommodate bitrate of the incoming bitstream of video data, by routing the incoming bitstream of video data to the trans-coding module to vary at least one encoding parameter of said incoming bitstream of video data.

2. The apparatus of claim 1 wherein the pass-through module comprises:
    a bitstream unpacking module;
    a buffer module coupled to the bitstream unpacking module;
    a video bitstream delimiter detection module coupled to the buffer module;
    a packet size determination module coupled to the video bitstream delimiter detection module; and
    a bitstream packing module.

3. The apparatus of claim 2 wherein the bitstream delimiter detection module is configured to maintain a copy of a set of received bits having a set number less than or equal to a number of bits associated with an expected bitstream delimiter.

4. The apparatus of claim 2 wherein the packet size determination module is configured to determine a size for a next packet to be packed by the bitstream packing module.

5. The apparatus of claim 4 wherein the size for the next packet to be packed is zero.

6. The apparatus of claim 1 wherein the trans-coding module comprises a trans-rating module configured to vary the bandwidth used to represent the incoming bitstream of video data.

7. The apparatus of claim 6 wherein the trans-rating module comprises:
    a decode module;
    a data duplicating module coupled to the decode module;
    an encode module coupled to the data duplicating module; and
    an encode parameter setting module coupled to the decode module and the encode module.

8. The apparatus of claim 7 wherein the decode module is configured to decode one or more video macro blocks at any one time.

9. The apparatus of claim 7 wherein the data duplicating module is configured to:
    extract one or more video macro blocks from the decoder before the decode process on the one or more video macro blocks has been completed; and
    provide the extracted one or more video macro blocks to the encode module.

10. The apparatus of claim 7 wherein the encode parameter setting module is configured to determine a set of one or more encode parameters based on a set of one or more decode parameters.

11. The apparatus of claim 7 wherein the encode parameter setting module determines a set of one or more encode parameters in response to a video bit rate control signal.

12. The apparatus of claim 7 wherein the encode parameter setting module determines a set of one or more encode parameters in response to a quality control signal.

13. The apparatus of claim 7 wherein the encode parameter setting module determines a set of one or more encode parameters based on a combination of a set of one or more decode parameters, a video bit rate control signal, and quality control signal.

14. The apparatus of claim 7 wherein the trans-rating module further comprises an in-loop filtering module that is shared by the decode module and the encode module.

15. The apparatus of claim 1 wherein the switching module is responsive to control signal to switch the incoming bitstream from one of the pass-through module or the trans-coding module to another one of the pass-through module or the trans-coding module.

16. The apparatus of claim 1 further comprising a pre-switch bitstream scanning module coupled to the switch module and configured to determine if the incoming bitstream of video data can be switched from one of the pass-through module or the trans-coding module to another one of the pass-through module or the trans-coding module.

17. The apparatus of claim 1 wherein the switch module is configured to pass the incoming bitstream of video data to each of the pass-through module and the trans-coding module concurrently.

18. The apparatus of claim 1 further comprising an output switching module coupled to the pass-through module and the trans-coding module.

19. The apparatus of claim 1, wherein the switch module is further configured to respond to a determination that available bandwidth of the outgoing network connection is sufficient to accommodate bitrate of the incoming bitstream of video data, by routing the incoming bitstream of video data to the pass-through module.

20. A method for performing compressed video bitstream conversion with reduced algorithmic delay, the method comprising:
    receiving an incoming bitstream of video data;
    generating a multi-state control signal;
    responsive to a first state of the multi-state control signal:
        extracting from incoming data packets comprising the incoming bitstream of video data, a series of discrete media stream units, wherein each said media stream unit comprises an encoded representation of video data; and
        re-packetizing the extracted media stream units into outbound data packets for outward transmission,
        wherein segmentation of one or more of the extracted media stream units within the outbound data packets is different from segmentation of the same one or more media stream units within the incoming data packets,
        and wherein segmentation of the extracted media stream units within the outbound data packets is determined based on at least one data packaging rule applicable to a network transport layer carrying the outbound data packets;
    trans-coding the incoming bitstream in response to a second state of the multi-state control signal; and
    providing an output bitstream,
    wherein a multi-state control signal of the second state is generated responsive to determining that available bandwidth of an outgoing network connection for transmitting video data to a destination terminal is insufficient to accommodate bitrate of the incoming bitstream of video data, said second state signaling a step of varying at least one encoding parameter of the incoming bitstream of video data.

21. The method of claim 20 wherein re-packetizing the incoming bitstream comprises:
    un-packing the incoming bitstream;
    buffering the un-packed bitstream;
    scanning the buffered un-packed bitstream to locate an expected video bitstream delimiter;
    outputting a scanning result;
    determining a size for a next output packet based on the scanning result; and
    packing the next output packet with a quantity of bits that is less than or equal to the determined size.

22. The method of claim 21 wherein the determined size for the next output packet is zero.

23. The method of claim 20 wherein trans-coding the incoming bitstream comprises trans-rating the incoming bitstream.

24. The method of claim 23 wherein trans-rating the incoming bitstream comprises:
    decoding the incoming bitstream to provide one or more decoded video macroblocks;
    duplicating the decoded data to provide a first set of decoded data and a second set of decoded data;
    providing the first set of decoded data to a decoder;
    providing the second set of decoded data to an encoder;
    determining a set of encode parameters; and
    encoding the second set of decoded data to produce the output bitstream.

25. The method of claim 24 wherein determining the set of encode parameters comprises setting of a set of one or more encode in-loop filter parameters based on a set of one or more decode in-loop filter parameters, wherein an encode in-loop filter is stronger than a decode in-loop filter.

26. The method of claim 24 wherein determining the set of encode parameters comprises setting of a set of one or more encode parameters based on a required output bit rate.

27. The method of claim 20, wherein a multi-state control signal of the first state is generated responsive to determining that available bandwidth of the outgoing network connection is sufficient to accommodate bitrate of the incoming bitstream of video data, said first state signaling a step of routing the incoming bitstream of video data to a pass-through module configured to conduct the extracting step.

* * * * *